United States Patent
Stromberg et al.

(10) Patent No.: US 8,666,437 B2
(45) Date of Patent: Mar. 4, 2014

(54) MOBILE COMMUNICATIONS RESOURCE MANAGEMENT SYSTEM

(75) Inventors: Russel M. Stromberg, Seattle, WA (US); James W. Pacyga, Seattle, WA (US); Daniel W. Knodle, Seattle, WA (US); Robin L. Callender, Seattle, WA (US)

(73) Assignee: Iota, Inc., Seattle, WA (US)

( * ) Notice: Subject to any disclaimer, the term of this patent is extended or adjusted under 35 U.S.C. 154(b) by 459 days.

(21) Appl. No.: 12/984,475

(22) Filed: Jan. 4, 2011

(65) Prior Publication Data

US 2011/0165896 A1 Jul. 7, 2011

Related U.S. Application Data

(60) Provisional application No. 61/292,306, filed on Jan. 5, 2010.

(51) Int. Cl.
*H04W 4/00* (2009.01)
*H04M 1/00* (2006.01)

(52) U.S. Cl.
USPC ...... 455/466; 455/422.1; 455/558; 455/556.1

(58) Field of Classification Search
USPC ............................ 455/466, 422.1, 558, 556.1
See application file for complete search history.

(56) References Cited

U.S. PATENT DOCUMENTS

| | | | |
|---|---|---|---|
| 7,299,008 B2 * | 11/2007 | Gluck | 455/41.2 |
| 7,382,771 B2 | 6/2008 | Leblanc et al. | |
| 7,827,581 B1 * | 11/2010 | Eiger et al. | 725/81 |
| 7,907,559 B2 * | 3/2011 | Fodor et al. | 370/328 |
| 7,957,733 B2 | 6/2011 | Wang et al. | |
| 8,108,020 B2 * | 1/2012 | Anderson et al. | 455/575.7 |
| 8,121,645 B2 | 2/2012 | Pascht et al. | |
| 8,213,991 B2 | 7/2012 | Deprun | |
| 8,412,096 B2 | 4/2013 | Sutskover et al. | |
| 2007/0265034 A1 | 11/2007 | Kasslin et al. | |
| 2007/0287498 A1 * | 12/2007 | Wang et al. | 455/556.1 |
| 2008/0032738 A1 * | 2/2008 | Boyer et al. | 455/556.1 |
| 2008/0176518 A1 * | 7/2008 | Pascht et al. | 455/67.11 |
| 2009/0046677 A1 | 2/2009 | Toledano et al. | |
| 2010/0234051 A1 | 9/2010 | Holden et al. | |
| 2010/0261464 A1 * | 10/2010 | Deprun | 455/418 |
| 2011/0045785 A1 * | 2/2011 | Sutskover et al. | 455/69 |
| 2011/0047581 A1 * | 2/2011 | Caspi et al. | 725/80 |
| 2011/0059769 A1 * | 3/2011 | Brunolli | 455/556.1 |

FOREIGN PATENT DOCUMENTS

KR 2003-0032119 11/2007

* cited by examiner

*Primary Examiner* — Christopher M Brandt
*Assistant Examiner* — Muthuswamy Manoharan

(57) ABSTRACT

A mobile communications resource manager including a smart card configured to accept and store a user's personal information suitable for use in commercial transactions (physical tap or electronically) and communications operations, a cellular radio modem, at least one non-cellular radio modem and a controller. The controller is configured for establishing a short-range wireless connection via said non-cellular modem to at least one user accessible electronic device with human interface functionality and accepting a service request from the at least one user accessible electronic device and making a modem selection by selecting either a cellular or a non-cellular connection via a modem resident in the mobile communications resource manager to provide the communications link for the service request, based on a rule resident in the mobile communications resource manager.

17 Claims, 13 Drawing Sheets

MOBILE COMMUNICATIONS RESOURCE MANAGEMENT SYSTEM

RELATED U.S. APPLICATION

This application claims priority to the provisional patent application Ser. No. 61/292,306, entitled "MOBILE COMMUNICATIONS RESOURCE MANAGEMENT SYSTEM," with filing date Jan. 5, 2010, assigned to the assignee of the present application, and hereby incorporated by reference in its entirety.

FIELD

This application relates to a wearable, connected device which interacts with a multiplicity of (a) fixed user accessible electronic devices, (b) mobile user accessible devices, (c) and various wireless networks that together with automated network connection management among these nodes and networks form a seamless interactive communication, wallet and keys experience incorporating secure personal information and credentials.

BACKGROUND

Electronics manufacturers are developing desirable portable devices, which include netbooks, Internet tablets, and personal media players that typically do not have mobile voice capability. Some of these devices are also having operating systems installed that are similar to mobile phones, which gives the manufacturer the option to include a radio interface layer and to support telephony service applications. For example, Google's (of Mountain View, Calif.) Android™ operating system (OS), which was originally designed for mobile phones, is being ported to various general consumer electronics. Android™ is an open-architecture software that allows manufacturers to tailor functionality as they choose. Another example of this open architecture OS is Meego.

Other traditional input and display devices such as televisions, PCs, laptops/notebooks as well as emerging devices such as foldable organic light-emitting diode screens, portable projection screens, touch screen home electronics and touch surfaces in public spaces offer consumers an alternative larger screen experience to the hand-held smart-phones. Such screen user interfaces may make use of communications services and network access directly, and will benefit from devices like the wireless mobile communications resource manager 200. In addition to Android™, software companies and other open operating systems (OS) like Linux are including mobile telephony services support, and as such may also benefit from integration with the services available via the MCRM 200. Further, beyond the current national Mobile Network Operator (MNO) mobile networks, Wi-Fi, to-the-door fiber expansion and new national mobile broadband-only networks offer an alternative mobile data experience.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Overview

Embodiments of the present technology provide a small, portable and wireless mobile communications resource manager (MCRM), a smart card enabled device, capable of functioning as a consumer's phone, wallet and keychain. The MCRM securely and wirelessly connects with, but not limited to, at least one of the following user accessible electronic (UAE) devices: personal consumer electronics with easy touch screen interfaces, general computing devices (e.g., with keyboard/mouse based interfaces), publicly available touch screen surfaces, and wireless transaction devices found at a point of sale. The UAE devices do not need and/or have cellular modems or smart cards embedded therein to support telephony services or the data associated with secured transaction services.

In embodiments of the present technology, the MCRM comprises at least one or more smart cards, multiple radios and associated modems, and a controller. The MCRM does not have a traditional keyboard or textual display as in a cellular phone, but does support a limited user interface. Secondary functional components of the MCRM include a USB controller and power connection, an on-board rechargeable battery and internal and optionally external antennas.

Smart cards are commonly found in the market place as cellular phone SIMs, credit cards, bank cards, health insurance cards, transit cards and identification cards. In one embodiment, the MCRM's smart cards include personal account information regarding the user and configuration rules having a variety of applications, such as making a modem selection based on needs and characteristics of a requested service or application and based on a user preference. Embodiments of the present technology merge the uses and capabilities of smart cards with mobile communication capabilities to accomplish a new wireless wallet.

Figure 1:
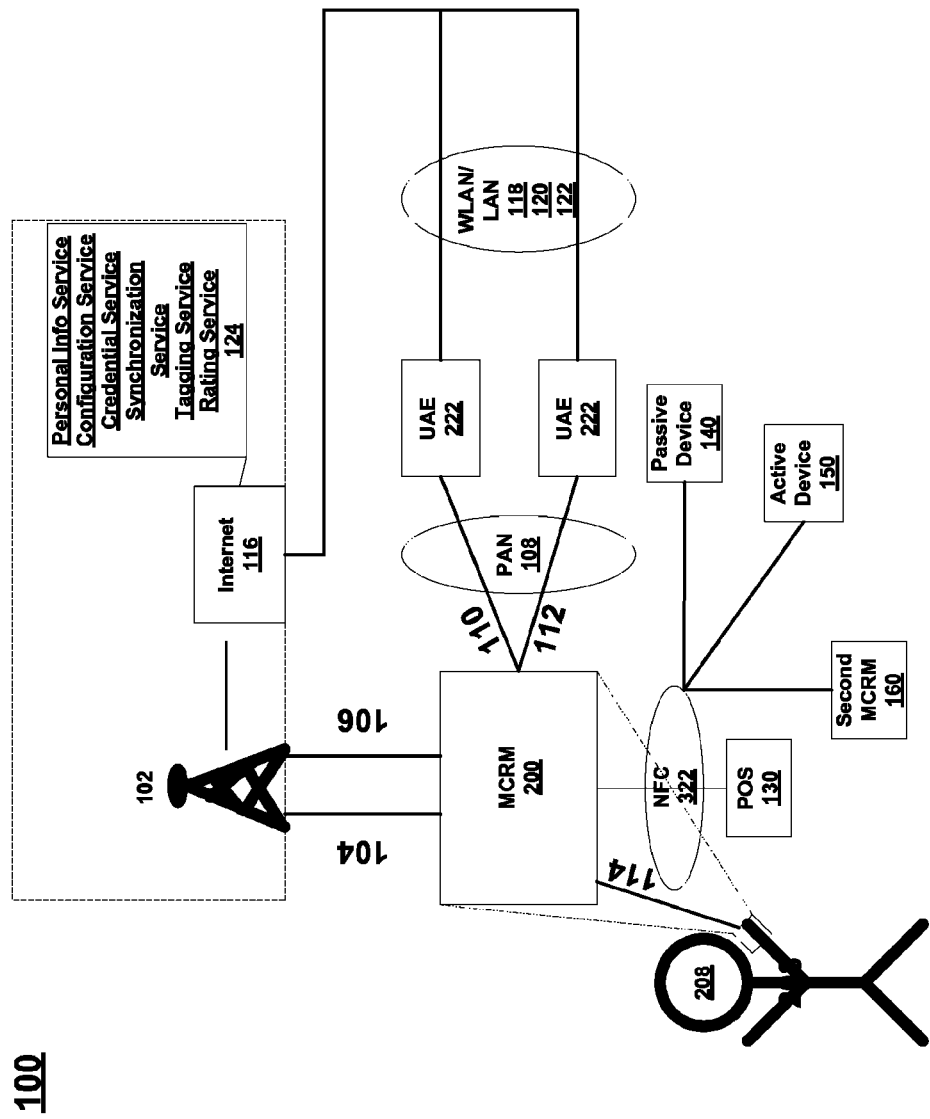
FIG. 1 is a pictorial diagram illustrative of the scope of current services involving mobile communications, user accessible electronic devices, and remote purchase transactions, in accordance with embodiments of the present technology.
Figure 2:
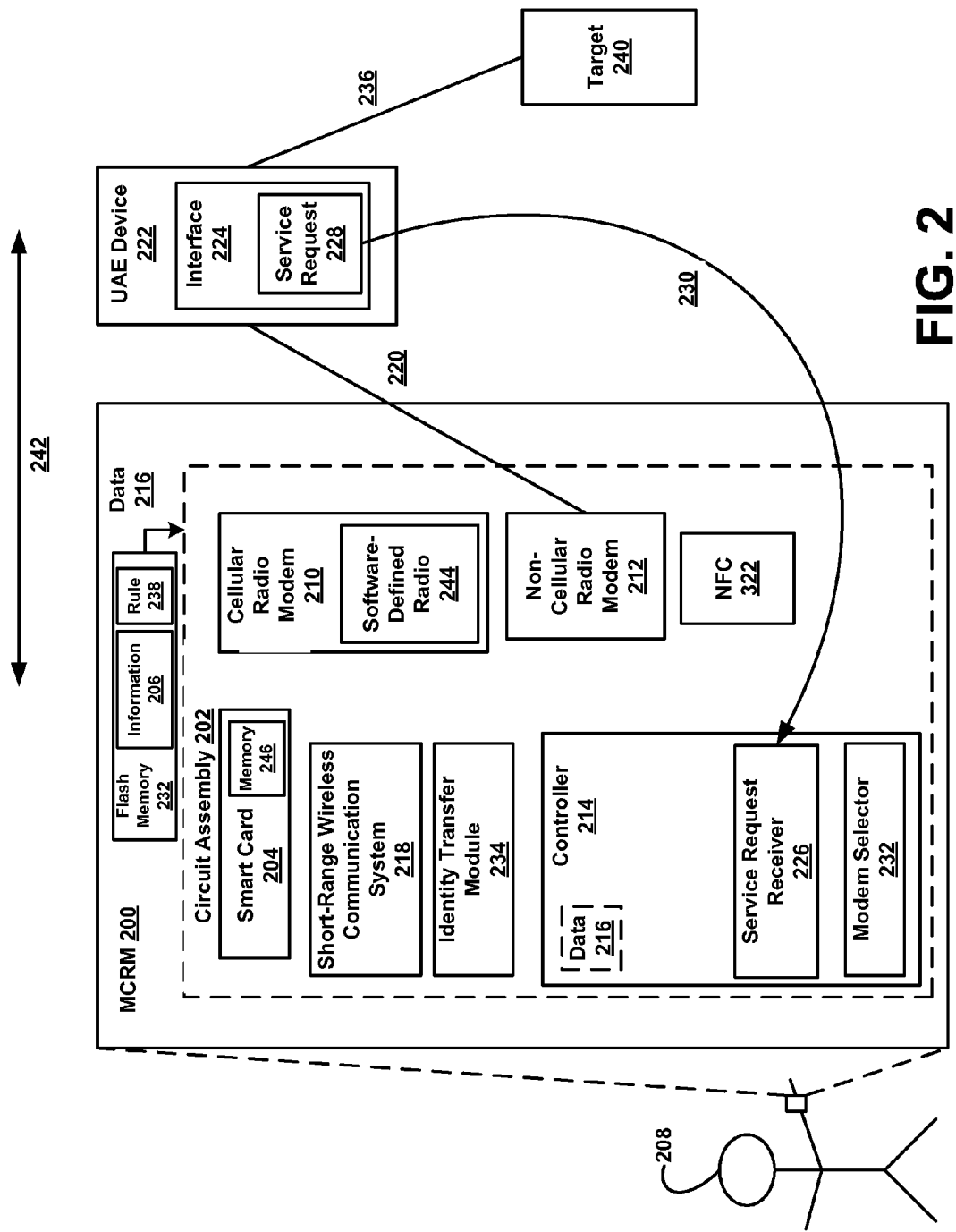
FIG. 2 is a block diagram of a mobile communications resource management system for providing alternate communications paths and services to a variety of different user accessible electronic devices, in accordance with embodiments of the present technology.

With regards to FIG. 1 and FIG. 2, a pictorial diagram 100 illustrative of the scope of current services involving mobile communications, user accessible electronic devices, and remote purchase transactions is shown. As shown, FIG. 1 includes a MCRM 200 coupled with user 208. In brief, by way of a mobile network 102 supporting mobile telephony voice and data 106 and over the air management 104, MCRM 200 may communicate with the Internet 116. The MCRM 200 shall communicate with an UAE device 222. The communication may include, but is not limited to, at least one of the following: personal area network (PAN) 108, voice and data services via mobile telephony, APIs (application programming interfaces) and Rules for an UAE device 222 and application configuration 110 via securely paired and high-speed connection 112. In one embodiment, the mobile network 102 may be a multi-band mobile network voice and data configured RF transceiver and baseband, specifically GSM/GPRS at this time (and create iterative versions with next GSM evolution-related radio access technologies such as EDGE, HSPA, UMTS and LTE (Long Term Evolution, also known as "4G").

In one embodiment, the user 208 gives the authorization 114 for the UAE Device 222 pairing. For example, the authorization 114 may come in the combination of a physical button press on the MCRM 200 and/or user interaction via the interface provided by the UAE Device 222. Once authorized, the UAE Device 222 may access the information 206, data 216 and rules 238 of the MCRM 200 smart card 204; data 216 within the Controller 214; data 216 with the Flash Memory 232; information 206 and applications within Near-Field Communications (NFC) based smart card 328. The UAE Device 222 may also access the Internet 116 through at least, but not exclusively, the following: public LAN/WAN 118, home LAN/WAN 120 and Enterprise 122. Cloud services 124 may be accessed by the UAE Device 222 via this route to the Internet 116, Synchronization of the cloud services 124 and the MCRM 200 stored information 206 and personalized configurations of rules shall be provided for via this route to the Internet 116. This synchronization is also possible via the link between the mobile network 102 and the Internet 116.

Embodiments of the present technology enable a user 208 to perform financial transactions as well as any other function capable of a POS device 130 that is configured to be compatible with the MCRM 200. As long as a POS device 130 compatible with a MCRM 200 is available to a user 208, the user 208 need only carry the MCRM 200 to do such things as purchase items or perform transit ticketing (e.g., bus card).

Further embodiments of the present technology enable a user 208 to use the MCRM 200 as a keychain similar to a present day card keys or remote entry key fobs. The user need only carry the MCRM 200 to open door locks or start a car.

Embodiments of present technology enable the user to make and receive phone calls via the limited user interface of the MCRM 200 without the need of a connection to more robust interfaces provided by User Accessible Electronics 222 devices.

Further embodiments of the present technology also allow a user to pair a first MCRM device with a second MCRM device and transfer the users personal information from the first MCRM device to the second MCRM device. Thus a user may switch between MCRM devices for various reasons.

Further embodiments of present technology allow for the MCRM to utilize credentials stored within either secure element 204 or 328 or memory 232 to authenticate to various services and resources (e.g., websites).

Thus, embodiments of the present technology enable general computer electronics manufacturers to offer UAE devices 222 that support telephony, data, and secured transaction services without an embedded cellular modem or smart card therein. Other options of the UAE Device 222 like Point-of-Sale (POS) rely on their own connections to complete transactions. It is the near-field communication element NFC 322 between this and the MCRM 200 that is of interest.

The following discussion of embodiments of the present technology will begin with a description of the terminology used herein, followed by a discussion of the structure of the MCRM 200, and then followed by a description of the operation of the MCRM 200.

Terminology

Cellular Phone: A mobile phone or mobile (also called cell phone or hand phone) is an electronic device used for mobile telecommunications (mobile telephony, messaging or data transmission) over a cellular network of specialized base stations known as cell sites. As opposed to a radio telephone, a cell phone offers full duplex communication, automated calling to and paging from a public land mobile network (PLMN), and handoff (handover) during a phone call when the user moves from one cell (base station coverage area) to another. Cell phones connect to a cellular network consisting of switching points and base stations (cell sites) owned by a mobile network operator. In addition to the standard voice function, current mobile phones may support many additional services, and accessories, such as Short Message Service (SMS) for text messaging, email, packet switching for access to the Internet, gaming, Bluetooth, infrared (iRDA), camera with video recorder and Multi-media Messaging Service MMS for sending and receiving photos and video, MP3 player, radio and GPS.

Modem: A modem is a device that modulates an analog carrier signal to encode digital information, and also demodulates such a carrier signal to decode the transmitted information. Modems meant to access a network of base stations that form a cellular network are cellular modems. Modems that use mobile phone channels (GPRS, UMTS, HSPA, EVDO, WiMax, etc.), are known as cellular modems. Cellular modems can be embedded inside a laptop or appliance, or they can be external to it. External cellular modems are datacards and cellular routers. Modems that do not use mobile phone spectrum are known as non-cellular modems.

Wi-Fi: Wi-Fi is a trademark of the Wi-Fi Alliance that may be used with certified products that belong to a class of wireless local area network (WLAN) devices based on the IEEE 802.11 standards. (Current standards allow for 144 Mb/s and 802.16m allows for 1 Gb/s. Because of the close relationship with its underlying standard, the term Wi-Fi is often used as a synonym for IEEE 802.11 technology. Wi-Fi is a local area network that uses high frequency radio signals to transmit and receive data over distances of a few hundred feet; uses Ethernet protocol.

Wi-Max: Wi-Max is a telecommunications technology that provides wireless transmission of data using a variety of transmission modes, from point-to-multipoint links to portable and fully mobile Internet access. The technology provides up to 10 Mbit/s broadband speed without the need for cables. Also, Wi-Max is a standard of interoperable implementations of IEEE 802.16 wireless networks, similar to the way the term Wi-Fi is used for interoperable implementations of the IEEE 802.11 Wireless LAN standard. Wi-Max is a long range system, covering many kilometers, that uses licensed or unlicensed spectrum to deliver a point-to-point connection to the Internet and uses a mechanism based on connections between the base station and the user device.

LAN: A local area network (LAN) is a computer network covering a small physical area, like a home, office, or small group of buildings, such as a school, or an airport. The defining characteristics of LANs, in contrast to wide-area networks (WANs), include their usually higher data-transfer rates, smaller geographic area, and lack of a need for leased telecommunication lines. In other words, data communications network that is geographically limited (typically to a 1 km radius) allows easy interconnection of terminals, microprocessors and computers within adjacent buildings. An Ethernet is an example of a LAN. Because the network is known to cover only a small area, optimizations can be made in the network signal protocols that permit data rates up to 100 Mb/s. (Currently, the Ethernet allows for 1 Gb/s.)

WLAN: A wireless local area network (WLAN) links devices via a wireless distribution method (typically spread-spectrum or OFDM radio), and usually provides a connection through an access point to the wider Internet. This gives users the mobility to move around within a local coverage area and still be connected to the network.

Ethernet: Ethernet is a family of frame-based computer networking technologies for local area networks (LANs). It defines a number of wiring and signaling standards for the Physical Layer of the OSI networking model, through means of network access at the Media Access Control protocol (a sub-layer of Data Link Layer), and a common addressing format. Ethernet is standardized as IEEE 802.3. The combination of the twisted pair versions of Ethernet for connecting end systems to the network, along with the fiber optic versions for site backbones, is the most wide spread wired LAN technology.

UART: A universal asynchronous receiver/transmitter (UART) is a type of "asynchronous receiver/transmitter", a piece of computer hardware that translates data between parallel and serial forms. UARTs are commonly used in conjunction with other communication standards such as EIA RS-232. A UART is usually an individual (or part of an) integrated circuit used for serial communications over a computer or peripheral device serial port.

RIL: A Radio Interface Layer (RIL) is a layer in an operating system which provides an interface to the hardware's radio and modem on, for example, a mobile phone. A RIL is a key component of a mobile OS. The RIL enables wireless voice or data applications to communicate with one or more modems on a given device. The RIL provides the system interface between the OS and the radio protocol stack used by the wireless modem hardware. The RIL, therefore, also allows OEMs to integrate a variety of modems into their equipment by providing this interface.

The RIL comprises two separate components: a RIL driver, which processes device specific AT commands and events; and a RIL proxy, which manages requests from the multiple clients to the single RIL driver. Except for PPP connections, all interaction between the OS and the device radio stack is via the RIL. (In an embodiment, PPP connections initially use the RIL to establish the connection, but then bypass the RIL to connect directly to the virtual serial port assigned to the modem.) In essence, the RIL accepts and converts all direct service requests from the upper layers (e.g., TAPI) into commands supported and understood by the modem. Traditionally, in a monolithic mobile phone device, the RIL is physically wired via a serial channel to the cellular modem.

The RIL of the UAE 222 implements the wireless connection between the UAE device 222 application processor and its ancillary components or processes and the physically separate cellular modem located in the MCRM 200 wearable device. In an embodiment, the connection between the UAE devices 222 and the wearable device in the MCRM 200 utilizes standard Bluetooth profiles and bypasses the RIL. In another embodiment, the MCRM 200 includes the RIL.

The following is a list of some of the acronyms used throughout the disclosure. Mobile Communications resource manager (MCRM), User Accessible Electronic (UAE), Mobile Network Operator (MNO), Near-Field Communication (NFC), Over The Air (OTA), Point Of Sale (POS), Subscriber Identity Module (SIM), Application Programming Interface (API), Global System for Mobile Communications (GSM), General packet radio service (GPRS), Local Area Network (LAN), Wide-Area Network (WAN), Personal Area Network (PAN), Public Land Mobile Network (PLMN), Universal Asynchronous Receiver/Transmitter (UART), A Radio Interface Layer (RIL), Quality of Service (QoS), Stock-Keeping Unit (SKU), Software-Defined Radio (SDR), Light Emitting Diode (LED), and Operating Systems (OS).

Example Structure of a Mobile Communications Resource Manager

With reference now to 200 of FIG. 2, a block diagram of a mobile communications resource management system for providing alternate communications paths and services to a variety of different UAE devices 222 is shown. In embodiments of the present technology, MCRM 200 includes a circuit assembly 202. In one embodiment, the MCRM 200 has no high resolution graphical user interface [GUI] display and no alphanumeric keypad.

In one embodiment, the circuit assembly 202 is mounted to, but is not limited to, at least one of the following: a single sided rigid circuit board 310 (of FIG. 3); a double sided circuit board; and a flexible plastic substrate. In one embodiment, in order to facilitate the compact size of the MCRM 200, the circuit assembly 202 may also utilize a thin-film battery rechargeable or energy harvesting technology.

The assembly may be arranged in line to reduce device width and height, or double side mounted to reduce device length. It is also possible to hinge two or more assembly areas to create foldable forms. The use of flexible substrates and foldable forms are used to create versions of the device (all internal components in common) which the user can wear or secure to their clothing or personal accessories. The device components shall be assembled in such a way to enable the assembly to be mounted in a variety of enclosures or form factors. To this end, a variety of manufacturing options may be utilized to create flexibility in the assembly or assemblies designed.

In one embodiment, the circuit assembly 202 includes a smart card 204, a cellular radio modem 210, at least one non-cellular radio modem 212, and a controller 214. In one embodiment, the controller 214 includes a bi directional service request receiver and notifier 226 and a modem selector 232.

Figure 3:
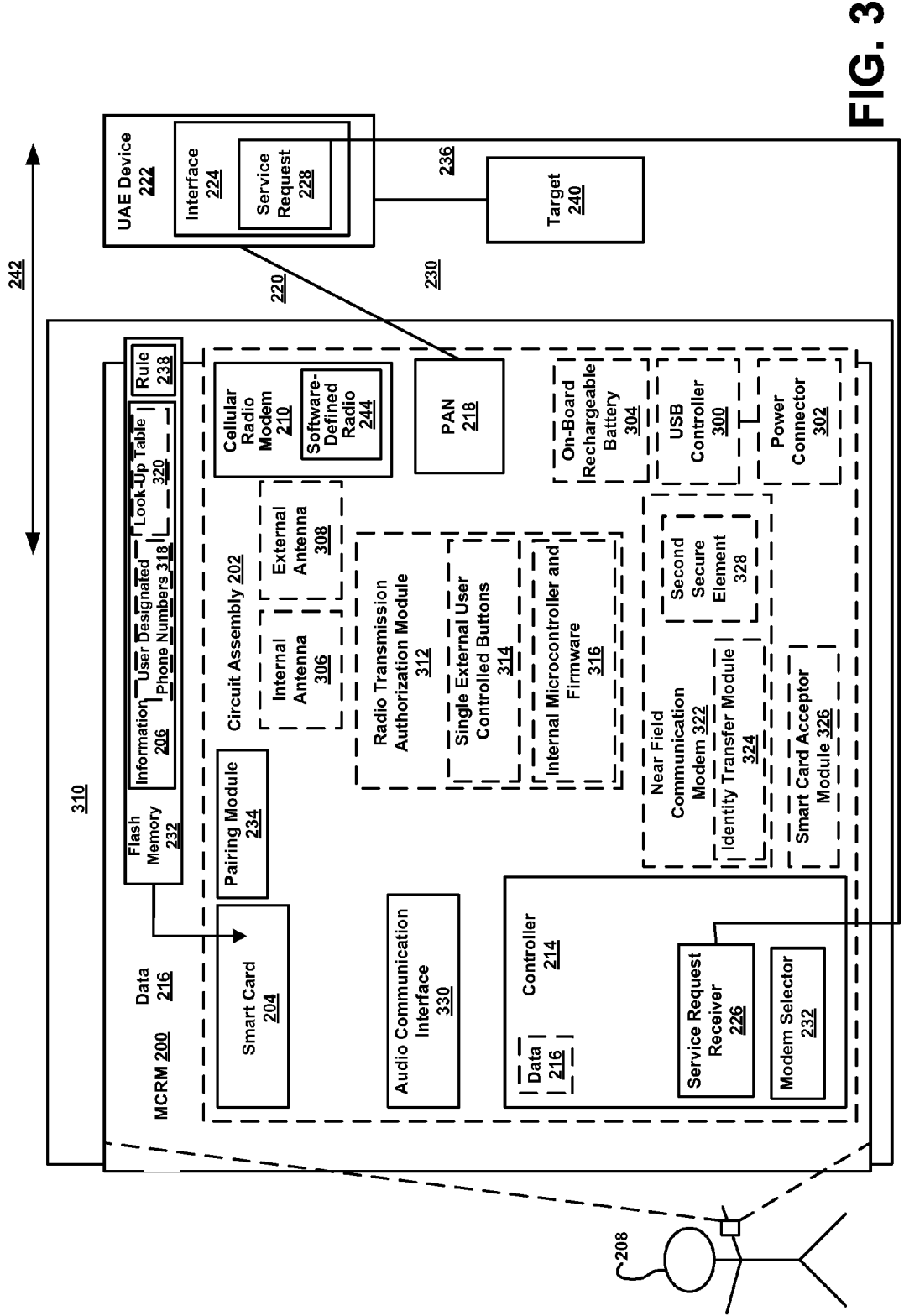
FIG. 3 is a block diagram of a mobile communications resource management system for controlling the communications modems resident in a variety of different user accessible electronic devices, in accordance with embodiments of the present technology.

Additionally, the circuit assembly 202, in one embodiment, includes: a near field communication modem 322 of FIG. 3 configured for close proximity data transfer (e.g., RFID tag reading, contactless transactions), an application processor, and a flash memory configured for application and data storage. In an embodiment, regarding the cellular modem 210, GSM/GPRS is utilized this time with intent to create iterative versions with next GSM evolution related radio access technologies such as EDGE, HSPA, UMTS and LTE, or perhaps alternate cellular access technologies (e.g., cdma2000, SC-TDMA or other similar technologies used by cellular service providers).

In one embodiment, the near field communication modem 322 is configured for use in management of connections and proximity based connectionless transactions of the at least one of the plurality of UAE devices 222. In one embodiment, the personal information of the user 208, regarding the involvement of the near field communication modem 322, is suitable for use in at least one of the following: commercial transactions; credential authentication; and communications operations (such as keychain applications [car locks, car ignition, door locks]).

In one embodiment, the short-range wireless communication system 218 is configured for establishing a short-range wireless connection 220 via the non-cellular modem 212 to at least one UAE device 222 with human interface 224 functionality. In one embodiment, the short-range wireless communication system 218 may be Bluetooth, which supports an audio path, dial up network and data connectivity. In one embodiment, the establishing of a short-range wireless connection 220 includes providing a password for accessing the at least one UAE device 222 determined from a lookup table accessible by the controller 214.

In one embodiment, the near field communication modem 322 includes an identity transfer application 324 within a second secure element (smart card) 328. In one embodiment, the applications and credentials for financial and other NFC (Near-Field Communciations) related trust operations reside in the second secure element 328. For example, these may be of the form Java applets within a JCOP smart card. The identity transfer application 324 is configured for enabling a transfer of identity and related personal and system data between at least two MCRM devices 200 that are of a same type, wherein one of the two MCRM devices 200 is a transfer initiating device. The transfer (sharing) of identity and related personal and system data enables the initiating device with shared identical credentials, as well as disabling a second device of the two MCRM devices 200, wherein the second device that is disabled looses the ability to access any and all of the credentials stored within it. These credentials are needed for communication, transaction or identity authentication.

In one embodiment, the MCRM 200 includes a memory 246. The memory 246, in one embodiment, may be considered to be a holder of secure information. In one embodiment, the memory 246 is configured for accepting and storing information 206 that is suitable for use in communications operations. The information 206 is associated with a user 208 of the MCRM 200. In another embodiment, the MCRM 200 is configured for accepting and storing a user's 208 personal information suitable for use in commercial transactions and communications operations or other personal credentials. It should be appreciated that commercial transaction as described in the present technology may be either electronic of physical tap commercial transactions. A physical tap may be when a first device is brought into close proximity with a second device which enables a Near Field Communication system to become activated which in turn activates an automatic data transfer function.

In one embodiment, the MCRM 200 includes a smart card acceptor module configured for accepting a foreign smart card associated with a user OTHER THAN user 208 into the MCRM. Upon insertion of a foreign smart card, the information 206 is temporarily removed by the MCRM 200, wherein the information 206 comprises personal information and credentials of the user 208, such that the foreign user has no access to that information.

Figure 10:
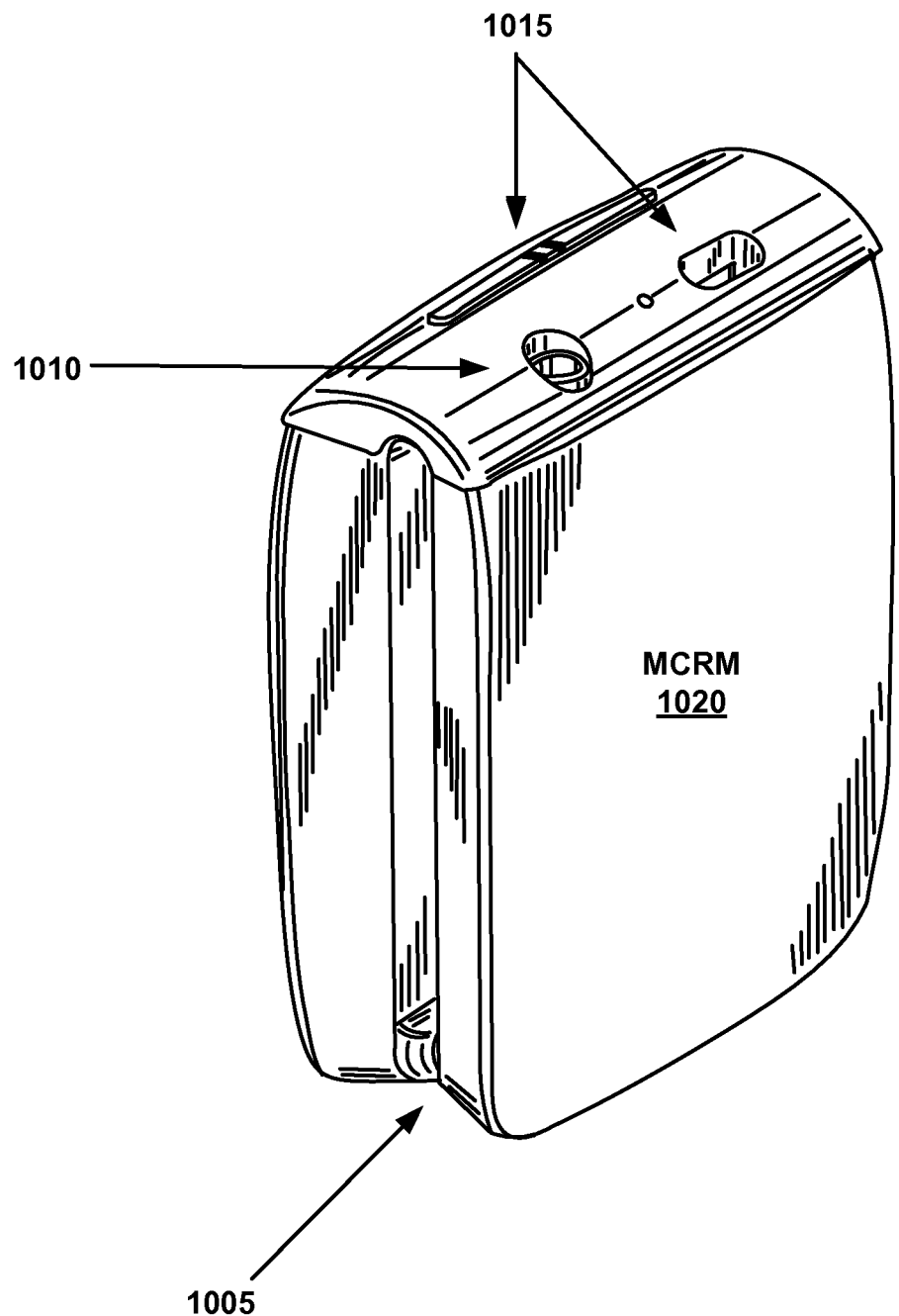
FIG. 10 is a pictorial diagram of a mobile communications resource manager platform, in accordance with embodiments of the present technology.

With reference now to 1020 of FIG. 10, a physical embodiment of hardware described in FIGS. 1 and 2 or an example mobile communications resource management platform or system for providing alternate communications paths and services to a variety of different UAE devices 222 is shown. It should be appreciated that MCRM 1020 of FIG. 10 may have all the components and capabilities of MCRM 200 of FIG. 2.

FIG. 10 depicts MCRM 1020 comprising controls 1015 which may or may not comprise toggle switches, buttons, and other controls to be operated by a user operating MCRM 1020. Such controls may be employed for powering MCRM 1020 on and off 1005 shows a clip that may be a component of MCRM 1020 that may be employed to clip MCRM 1020 to various locations. Clip 1005 may be used to clip MCRM 1020 to an article of clothing, the should strap of a bag or purse or other suitable locations. 1010 shows an optional headphone jack that may be employed with speakers and/or a microphone.

Figure 11:
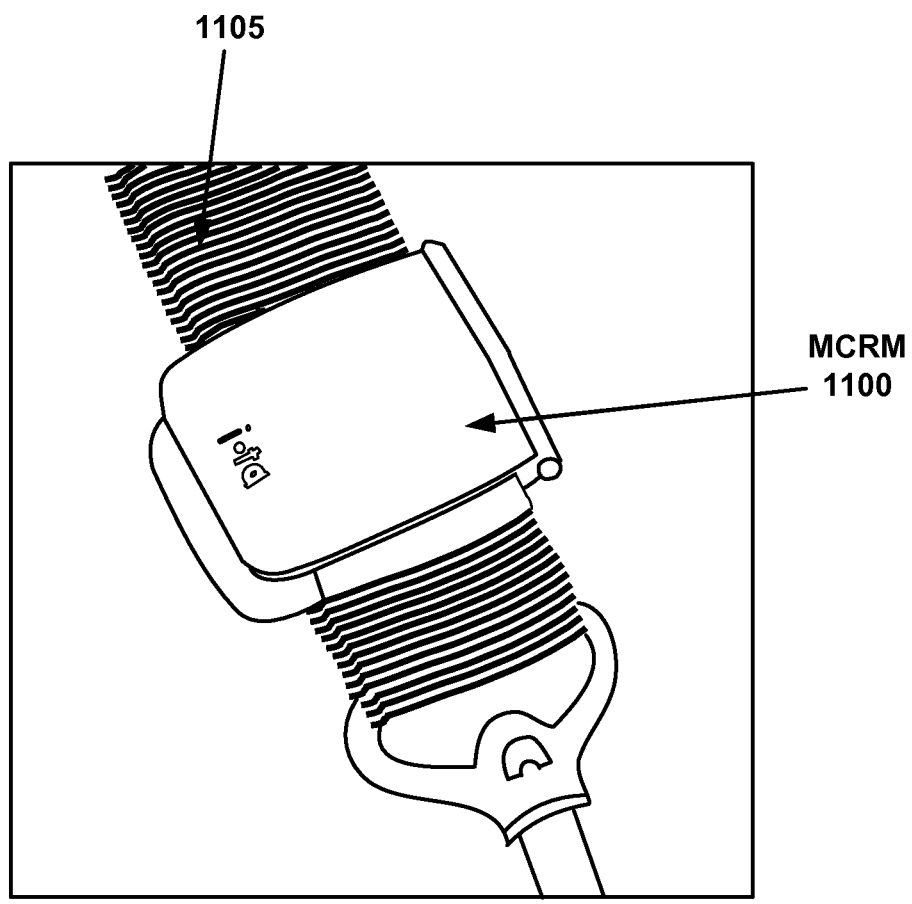
FIG. 11 is a pictorial diagram of a mobile communications resource manager platform, in accordance with embodiments of the present technology.

With reference now to 1100 of FIG. 11, a physical embodiment of hardware described in FIGS. 1 and 2 or an example mobile communications resource management platform or system for providing alternate communications paths and services to a variety of different UAE devices 222 is shown. It should be appreciated that MCRM 1100 of FIG. 11 may have all the components and capabilities of MCRM 200 of FIG. 2.

FIG. 11 depicts an embodiment MCRM 1100 clipped to the shoulder strap 1105 of a bag that may be worn by a user. Thus it is demonstrated that MCRM may be a small device that may be visually pleasing to an observer while performing is operations.

Provision of Services to Associated UAEs

In one embodiment, the smart card 204 is configured for accepting and storing information 206 that is suitable for use in communications operations. The information 206 is associated with a user 208 of the MCRM 200. In another embodiment, the smart card 204 is configured for accepting and storing a user's 208 personal information suitable for use in Commerce or POS commerce and communications operations or other personal credentials requiring secure storage.

In another embodiment, the MCRM 200 is configured to synchronize cloud-services based stored data to multiple UAE devices 222, wherein each of the multiple UAE devices 222 has its own set of rules. In yet another embodiment, the MCRM 200 is configured to synchronize cloud services-based stored data simultaneously without any connection from the UAE 222.

In one embodiment, the cellular radio 210 is configured for reading and writing data 216 to the smart card 204. In one embodiment, the reading and writing is controllable by the host controller 214. In one embodiment, the reading and writing is performed via over the air methods via the mobile network 104. The reading and writing may be performed via a linked external device. In one embodiment, the linked external device is the UAE device 222.

The service request receiver 226 is configured for receiving 230 a service request 228 from the at least one UAE device 222. The modem selector 232 is configured for making a modem selection by selecting either a cellular or a non-cellular connection, of the cellular radio modem 210 and non-cellular radio modem 212, respectively, via a modem resident in the MCRM 200 to provide a communications link 236 for the service request 228 based on a rule 238 resident in the MCRM 200. The logical communications link 236 is between the at least one UAE device 222 and a target 240 of the service request 228.

As stated herein, the UAE device 222 may be any number of electronic devices, such as but not limited to: a laptop, an MP3 player; a personal data assistant; and an audio headset. Further, in one embodiment, the at least one UAE device 222 is selected from a group of devices comprising, but not limited to: an unlocked cellphone; a netbook; an Internet appliance (or tablet) a laptop computer; a desktop computer; a device; an MP3 player; a one-way audio headset; a two-way audio headset; an automobile locking system; an automobile alarm system; an automobile ignition system; an automobile display system; an automobile hands free system; applications processors; memory; POS; and electronic locks. In one embodiment, the UAE device 222 is not equipped with a cellular modem.

Further, the communications link 236 may be any number of links, such as but not limited to: WiFi; Wi-Max; and WLAN. Moreover, the connection 242 between the MCRM 200 and the UAE Device 222 is accomplished over the Internet 116 or a via PAN 112 circuit. In one embodiment, the cellular radio modem 210 includes a software-defined radio 244.

In one embodiment, the software-defined radio 244 is configured to operate in a mode equivalent to that of a selected cellular service. In another embodiment, the software-defined radio 244 is reconfigurable in the MCRM 200 to operate in a mode equivalent to that of a selected cellular service provider. In one embodiment, a buzzer, such as a vibrating element, is used to alert that an incoming call has been received by the cellular radio modem 210 via a command from the controller 214.

In another embodiment of the present technology, the information 206 of the MCRM 200 includes user designated phone numbers 318 and look-up table 320 (shown in FIG. 3). Smart card 204 includes information 206 that includes user designated phone numbers 318 (shown in FIG. 3) and a look-up table 320 (shown in FIG. 3). In a further embodiment, user designated phone numbers 318 and look up table 320 may exist in Flash Memory 246 and be synchronized via a synchronization agent in controller 214 with cloud services 124.

In an embodiment, Flash Memory 246 may be used in preference to smart card 204 for storing personal information that may not require strong security (e.g., phone books, preferences, etc).

Connection Management

In one embodiment, the memory 246 of the MCRM 200 includes rule 238. While in another embodiment, the smart card is configured for accepting and storing rule 238. Thus, rules 238 and other configuration information may be located in the MCRM's 200 internal memory or onboard the smart card 204. Rule 238 includes, but is not limited to, at least one of the following: making a modem selection based on needs of the service request 228; making a modem selection based on a user-selectable Quality of Service (QoS) metric; making a modem selection based on a conservation of spectrum metric; making a modem selection based on a user preference, making a modem selection based on current throughput, making a modem selection based cost to the user or cellular service provider, making a modem selection based observed bandwidth usage of the requesting application or service, and making a modem selection based on a pre-programmed methodology to automate a procedure, without user 208 interaction.

In another embodiment, the rule 238 includes monitoring a QoS metric available from the selected modem and performing a switching function to automatically reconnect communications service to a selected server from a first selected modem to a second selected modem when the QoS metric passes a specified metric threshold. For example, one QoS metric might be bandwidth availability of a given path. In this case, while the system may initiate a connection on what is expected to be a well performing path, if the actual bandwidth available is actually much lower than the theoretical expected bandwidth, the system may choose to switch to a path which while having a lower theoretical maximum bandwidth might in practice be less congested hence offering greater performance to User 208.

In one embodiment, the conservation of spectrum metric includes selecting a non-cellular modem 212 whenever possible, according to Internet availability of a connection to the service request 228 and Internet availability via the non-cellular modem connection.

In another embodiment, the conservation of spectrum metric includes selecting non-cellular modems 212 for a specific communications service according to a sharing agreement between the specific communications service and a user's 208 selected cellular service.

In another embodiment, the connection manager, whose rules are contained within Rule 238, is able to create an optimal connection strategy based on the information in Rule 238 and the preferences defined by the user in Data 216. In absence of distinct user preferences in Data 216, the connection manager creates an optimal connection strategy based on Rule 238. The connection manager is able to dynamically adjust the connection strategy based on measurements of real time connection performance.

In an embodiment, the connection manager is able to determine cost of service from a number of available providers and institute Least Cost Routing. One example of the broadcast of rating information is Network Charge Rate and Advice of Charge.

In another embodiment, the connection manager may have a fixed cost for a set of service providers that each of which offer different service levels (e.g., GSM EDGE v. UMTS or HSPA). In this case, the system is able to maximize performance for User 208 in the execution of Service Request 228 by selecting the best available (theoretically) performing service given cost is a static factor. Conversely, the system may apply Least Cost Routing in this situation on behalf of a service provider 102 whose business is based on specific roaming relationships and hence select a path that respects the partner that service provider 102 has indicated offers more economical terms for roaming.

In another embodiment, the connection manager may choose to route an application via given path (cellular or non-cellular) based on observed application bandwidth requirements. That is, the connection manager has access to information locally or via a network element, for example, a rating service 124, on the performance of a given application on the UAE 222. The connection manager is able to factor this information into the overall connection selection for the Service Request 228. It is possible also for the connection manager to block access to a given path based on this information. In a further embodiment, the MCRM may log and submit observed behavior of applications as it relates to data usage or other factors back to the rating service 124 in order to formulate a more accurate rating. These ratings could be processed and provided in a way so as to inform users of an application's data requirements.

In a situation where User 208 pays for data services in an a la carte fashion (e.g., by the amount of data consumed), it may be useful for User 208 to be able to select applications they use based on the amount of data consumed. That is, in the case where a multitude of applications that provide a given service, the User 208 may wish to choose one that does so most efficiently. As such, the MCRM 200 and rating service 124 may provide such information to other services that provide these applications for User 208's consumption.

In another embodiment, the MCRM 200 is able to inform the user of the status of an application with respect to use or need of bandwidth and be able to surface recommendations on appropriate path to network based on managing User 208's bandwidth use limits on accounts associated with the various paths available (e.g., cellular and non-cellular). Furthermore, the connection manager is able to help the user manage to a data service subscription limit and/or minimize their subscription costs by routing and/or blocking bandwidth intensive applications away from or toward low cost or unrestricted paths.

Pairing a MCRM to a Second MCRM

Identity transfer module 234 allows MCRM 200 to be linked with a second MCRM. Such a linking would allow transfer of a user's personal information suitable for use in commercial transactions (physical tap or electronically) and communications operations from MCRM 200 to a second MCRM. Identity transfer module 234 may be a physical or logical component of MCRM 200 or may exist in other components of MCRM 200. For example, the functions of identity transfer module 234 may be carried out by controller 214 using smart cards 204 and/or 328 in conjunction with communication components of MCRM 200.

In one embodiment, identity transfer module 234 is capable of receiving a request, from a second mobile communications resource manager, to transfer said user's personal information suitable for use in commercial transactions (physical tap or electronically) and communication operations stored on the smart cards 204 and/or 328. Alternatively, for enhanced security, the identity transfer operation may be limited to being initiated by the currently active MCRM 200. Such information may include user credentials, contact information, financial account information, etc. Upon receiving the request, identity transfer module 234 may then transfer the user's personal information suitable for use in commercial transactions (physical tap or electronically) and communication operations to the second mobile communications resource manager. Such a transfer may take place using the physical communication components of MCRM 200. The transfer may occur using a wireless connection such as personal area network (PAN) or for increased security Near Field Communications modem 322. In one embodiment, the transfer does not require a physical element of MCRM 200 to be transferred to the second MCRM. For example, a SIM card or smart card may not be required to be physically transferred from MCRM 200 to the second MCRM for the transfer and pairing to take place. In one embodiment, both MCRM devices share common information and credentials but only the currently active MCRM 200 has the appropriate security token to enable the proper operation of the MCRM device. In this case, the identity transfer would be accomplished by simply transferring the security token from the MCRM 200 to the second MCRM; thus enabling the second MCRM and disabling the originally active device. Such disabling may or may not delete information form the originally active device.

In one embodiment, the receiving of a request to transfer and the actual transfer will not occur until after MCRM 200 physically contacts the second MCRM. For example, simply tapping the two devices together may initiate the identity transfer. A region on the exterior of MCRM 200 may be designated as the point of physical contact to initiate the pairing. An embodiment that requires the two devices to be physically tapped together ensures that both devices are physically proximate to each other thus ensuring that the pairing does not take place with a remote MCRM.

In another embodiment, a user may choose to authorize services 124 to transfer their cloud based personal information into a second MCRM 200. Thus a user might be able to replace a lost or stolen device without having to manually reconfigure a new device. Similarly, a user might have more than a single MCRM device and be able to effectively copy or clone their device configuration items into other devices owned by User 208.

In one embodiment, after the transfer of the user's personal information suitable for use in commercial transactions (physical tap or electronically) and communication operations is complete, the user's information is removed from the smart card. This removal ensures that there are not two MCRM devices that are simultaneously storing the same information. In alternate embodiment, the two MCRM devices may contain similar User information (i.e., configuration, information and credentials) but their accessibility and ability for them to be utilized to effect communications or transactions may be restricted without the appropriate authentication token, it would be this token that could be transferred between MCRMs with the identity transfer module, not the actual user data. Thus a user can be confident that the second device is the only active MCRM device able to function with the user's information. Such a pairing and transfer of information may be desirable for various reasons. Different MCRM devices may have different functionality or may have different form factors. MCRM device may be paired so that a user may switch to a second MCRM device for fashion reasons.

MCRM and Tagging

MCRM 200 may be employed in a system for tagging operations. Modern technology provides for near field communication tags. For example, an RFID tag may be read by a tag reader when the tag reader is in close proximity to an RFID tag. In one embodiment, MCRM 200 comprises a tag reader. It should be appreciated that tags and tag readers are not limited to RFID tags but may be other electronic tags that require close proximity of the tag and tag reader to operate.

In one embodiment, MCRM 200 is placed into proximity with a passive or active NFC compatible tag element. MCRM 200 may then receive or read data from the tag element. MCRM 200 may then contact a tagging service to receive more data regarding the tag element. For example, the data received from the tag element may be a URL that points MCRM 200 to data or a service on the Internet. MCRM 200 may then collect additional data from the user. This additional data may be data related to a context of the tag element and is transmitted to either the tag element or the tagging service. Such additional data may be user generated and may be collected from the user by the user inputting data via an interface located on MCRM 200 or an interface associated with UAE device 122. In one embodiment, MCRM 200 also transmits data related to the user's identity to the tag element.

An example of tagging may be a user visiting a retail establishment such as a restaurant. The user may enter the restaurant complete a dining experience. The restaurant may have a tag element or a plurality of tag elements. At the end of the dining experience the user may decide if the user "likes" or "dislikes" the restaurant. The restaurant may have two tag elements, one associated with "likes" and one associated with "dislikes." The user may then place MCRM 200 into contact with the appropriate tag element. Data is then transferred from MCRM 200 to a tagging service regarding the user's decision. The user may then be prompted to additional data such as comments or reviews regarding the restaurant. Such information may be added using MCRM 200 or a UAE device.

In the above example, the user may also employ a tag element in the restaurant before the user dines in the restaurant. The tag element may automatically direct the MCRM 200 to a tagging service which provides information regarding the restaurant such as user reviews.

In one embodiment, the tagging service may be located on the Internet and may host data as part of the tagging service or may refer the MCRM to a third party. For example, the tagging service may direct the MCRM to www.yelp.com or a similar website regarding user reviews of retail establishments or the like.

Detailed MCRM

Referring now to FIG. 3, a block diagram of an MCRM 200 is shown in accordance with embodiments of the present technology. In one embodiment, the circuit assembly 202 includes at least one of the following: a USB controller 300 coupled with a USB connection 302 providing power; an on-board rechargeable battery 304; at least one internal antenna 306 for each distinct radio present; and a radio transmission authorization module 312.

In one embodiment, the internal antennas 306 are arranged to facilitate a compact MCRM 200 and avoid interference such that the user can wear or easily secure the MCRM 200 to the user's clothing or accessories.

User Controls

In an embodiment, user controllable buttons or switch gear are provided to facilitate specific functions. These buttons may take the form of any switch like electronics component such as but not limited to thin film fingerprint sensor, traditional switchgear or touch button. These functions can be, but are not limited to: device pairing, volume control, power switch (on/off), wallet activation and reset device.

In one embodiment, the logical authorization to pair device module 312 includes but is not limited to the following physical and logical components: a single external user controlled button 314, an internal microcontroller and firmware 316. The single user controlled button 314 and the associated firmware 316 in the host controller 214 allows the device to be placed into a mode whereby the PAN radio will attempt to locate compatible devices with which to exchange pairing information (as master or host). In an alternate embodiment, user interface 224 can also be utilized to control the pairing behavior of the MCRM 200.

In one embodiment, a user controllable button 314 shall enable the user 208 to receive or initiate calls using a number of user designated phone numbers 318 registered in the phone book, resident on the MCRM 200 and/or the smart card 204 or internal Flash Memory 246. The initiation of calls shall require, in a further embodiment, a wired headset and the ability of the system to provide voice recognition to facilitate the selection of a called party. Audio communication interface 330 may include a 3.5 mm jack used to accommodate a wired headset which includes both speakers and a microphone. In this sense, the MCRM 200 can itself be operated as a phone device by user 208 without the need of an associated user interface provided by a UAE 222.

In one embodiment, a user controllable button shall be provided to allow the user to perform a reset of the internal host controller in the event that the device becomes inoperable.

In an embodiment, a user controllable switch or switches, for example, a rocker switch, can be provided to control the volume of the associated wired headset by modifying the output power of the audio module contained in the cellular radio 210.

In an embodiment, the functions of any or all of the user controllable buttons can be duplicated in a graphical user interface that is provided via an associated and connected UAE 222. In a further embodiment, functions may be integrated into few physical buttons that change in relation to the internal state of the device and the context. For example, a single user controllable button 314 could be provided to initiate a call from the idle state and end a call from the "in-call" state.

In one embodiment, the power connection 302 is configured for drawing power from a power source, a peripheral or host power source. In one embodiment, the on-board rechargeable battery 304 is configured for powering the circuit assembly 202 during the communications operations. In one embodiment, the communications operations include commercial transactions or data exchange between MCRM 200 and connected UAE(s) 222. Further, the internal antennas 306 are configured for providing transmission and reception in the various operating RF frequency bands of the internal radios.

Form Factor

The assembly of components of the present technology has a very small footprint that can be placed into a wearable or small accessory for consumers. A primary operation of the MCRM 200 is to separate the cellular radio 210 and advanced smart card 204 (radio modem and associated subscriber module [or smart card]) from the specific UAE device 222, freeing the UAE device 222 from the additional Bill of Materials (BOM) cost of additional radios and the need to pass stringent FCC device approvals before being able to be marketed and sold.

As stated herein, further functional components of the MCRM 200 include, a near field communication system, including the near-field communication modem 322, on chip microcontroller architecture, and an audio in/out connection to support an externally connected headset.

The near-field communication system on chip microcontroller architecture addresses near field communication use cases in conjunction with user specified information and/or unique identifiers stored in the non-volatile memory within the MCRM 200 or other memory. Near-field communication will also be used in device pairing processes to provide for added security or to select a particular UAE for use. For example, the user 208 can touch the MCRM 200 to an in-car navigation and control screen that supports hands-free mobile telephony environment to switch to it or activate a connection to it. NFC device pairing capabilities could be used in lieu of or in conjunction with the single external user controlled button 314. Radio Frequency ID (RFID) tags or other similar NFC readable technology may be required on the UAE(s) 222 to support out-of-band pairing or UI activation (the passing of control from one UAE 222 to another by tapping the MCRM 200 to the new controlling UAE 222). Furthermore, the NFC system may be used to provide support for mobile wallet use cases (commercial transactions) and/or social tagging (interacting with active or passive NFC compatible elements and communicating with remote services to publish various forms of information about the User 208 and entities 140 or 150.

The audio in/out connection supports an externally connected headset. A codec microcontroller may be included in the internal assembly to support and/or improve audio quality over the wired interface (e.g., noise cancellation technology). In addition to or in lieu of an audio in/out connection, Bluetooth radio in the assembly can simultaneously support a paired wireless headset. The inclusion of an audio in/out and/or wireless headset connection allows the user 208 to carry on a conversation when moving outside the range of the linked external device used to initiate or receive the call as well as maintain one connection point for audio when moving from one externally linked device to another externally linked device.

The insertion of a wired headset into the audio in/out connector shall cause the device to redirect audio to the wired headset from the current wireless connection. This change in audio path shall not affect the control channel used to establish the call and the user interface shall be maintained on the originating appliance until connection that appliance is lost. In any event, the user may terminate a call in progress from the user interface on the MCRM 200.

Further, in embodiments of the present technology, the primary functional software components of the MCRM 200 includes, and is not limited to, the following: a user controlled, as well as operator or manufacturer administrative controlled, applications to read and write data to the smart card 204, Memory 246 or second secure element 328 which can be either through over the air methods or through a linked external device; applications, or abstraction layers, that allow access to hardware elements on the MCRM 200 from associated appliances; mobile radio controller; PAN radio controller; connection manager; memory manager; and user interface controller. The software (or firmware) of the MCRM 200 shall be updatable via local connection or over the air methods. Additionally, the software supports the ability to configure secure and/or encrypted credentials and personal information via local connections and/or over the air methods.

Example Operation of the Mobile Communications Resource Manager

In embodiments of the present technology, the MCRM 200 described herein performs a variety of functions and enables a wide variety of activities, from telephone calls, to completing financial transactions, to the operation of an assortment of electronic devices.

For example, in one embodiment, the MCRM 200 described herein enables a UAE device 222 in close proximity to the MCRM 200 to contact a remotely located supplier of goods or services and make a purchase. This purchase is charged to a funding source under the control of the user 208, via a wireless modem resident in the UAE Device 222 utilizing credentials resident within the MCRM 200. The contact may be made via a cellular connection to an Internet service, via a non-cellular connection to an Internet service, or via a direct point-to-point connection to the Internet service (e.g. making a phone call to a person at the other end).

Further, in another example, the MCRM 200 described herein enables an UAE device 222 in close proximity to the MCRM 200 to contact a remotely located supplier of goods or services and make a purchase. This purchase is charged to a funding source under the control of the user 208, via a wireless modem resident in the UAE device 222. In yet another alternative, the user may activate MCRM 200's wallet mode via the UAE 222 or the user interface of the MCRM 200, in which case the NFC radio 322 will interact with a merchants' compatible POS 130 terminal to complete the transaction.

In another example, the user 208, may use the NFC 322 of the MCRM 200 as a reader of passive NFC compatible devices (e.g., RFID stickers) or active NFC devices (e.g., POS terminals or Peer-to-Peer NFC devices). The MCRM 200 can use one of the wireless connections to communicate information associated with the device to remote service 124. Remote service 124 would be able to identify the user by the origin of the messaging and the appropriate action or actions to take based on the information contents of the element with which it interacts. The purpose of this could be, but not limited to, social tagging, geo caching, providing user feedback on a business or service, etc.

Moreover, in yet another example, the MCRM 200 described herein enables connection management with aim to alleviate spectrum congestion and/or maximize service performance on either cellular voice circuits or data circuits used to access the Internet. This conservation/spectrum sharing is achieved by implementing a user preference system for seeking non-cellular services and using them before making a cellular phone call, or before using the 2G/3G/4G cellular networks for access to the Internet. In embodiments of the present technology, the user 208 may make choices regarding communications operations, such as a default choice, or consideration of, but not limited to, at least one of the following factors: high performance to maintain high quality QoS; least costly; application rating; and spectrum conservation.

In one embodiment, the default choice is a selection regarding cellular use that the user 208 configures in advance, such as "always using cellular". In one embodiment, in consideration of "high performance", the MCRM 200 tests signal strength on Bluetooth, Wi-Fi, and Cellular. The service with the strongest signal is chosen. The MCRM 200 regularly monitors the signal strengths and channel performance and performs real-time switching of services as needed to maintain a high quality QoS. In one embodiment, in consideration of the "least costly", the MCRM 200 always tries to use Bluetooth or Wi-Fi first. The MCRM 200 then tries to use cellular second. The MCRM 200 is continuously checking for availability of free circuit and switches whenever possible. In yet another embodiment, in consideration of "spectrum conservation", and based on the cellular provider's current service needs, the MCRM 200 may start with cellular but transition to Wi-Fi. Or, if there is a way to communicate with the carrier via a common signaling channel, the MCRM 200 may receive instructions to just use Wi-Fi at a particular time and location. In the alternative, the MCRM 200 may try to utilize the primary cellular radio, and if the circuits are busy, then the MCRM 200 will fallback to the other radios at it's disposal (e.g., a second cellular radio, Wi-Fi, etc).

As an overview of the operation potential of the MCRM 200, embodiments of the present technology enable consumers to have an ultra-portable wireless device that does not have a high-resolution screen or numeric keypad/qwerty keyboard, but can borrow an interface 224 from an UAE device 222 that is compatible with the MCRM 200. The interface 224 enables the MCRM 200 to fulfill a large number of functions, as has been and will be described herein.

Figure 4:
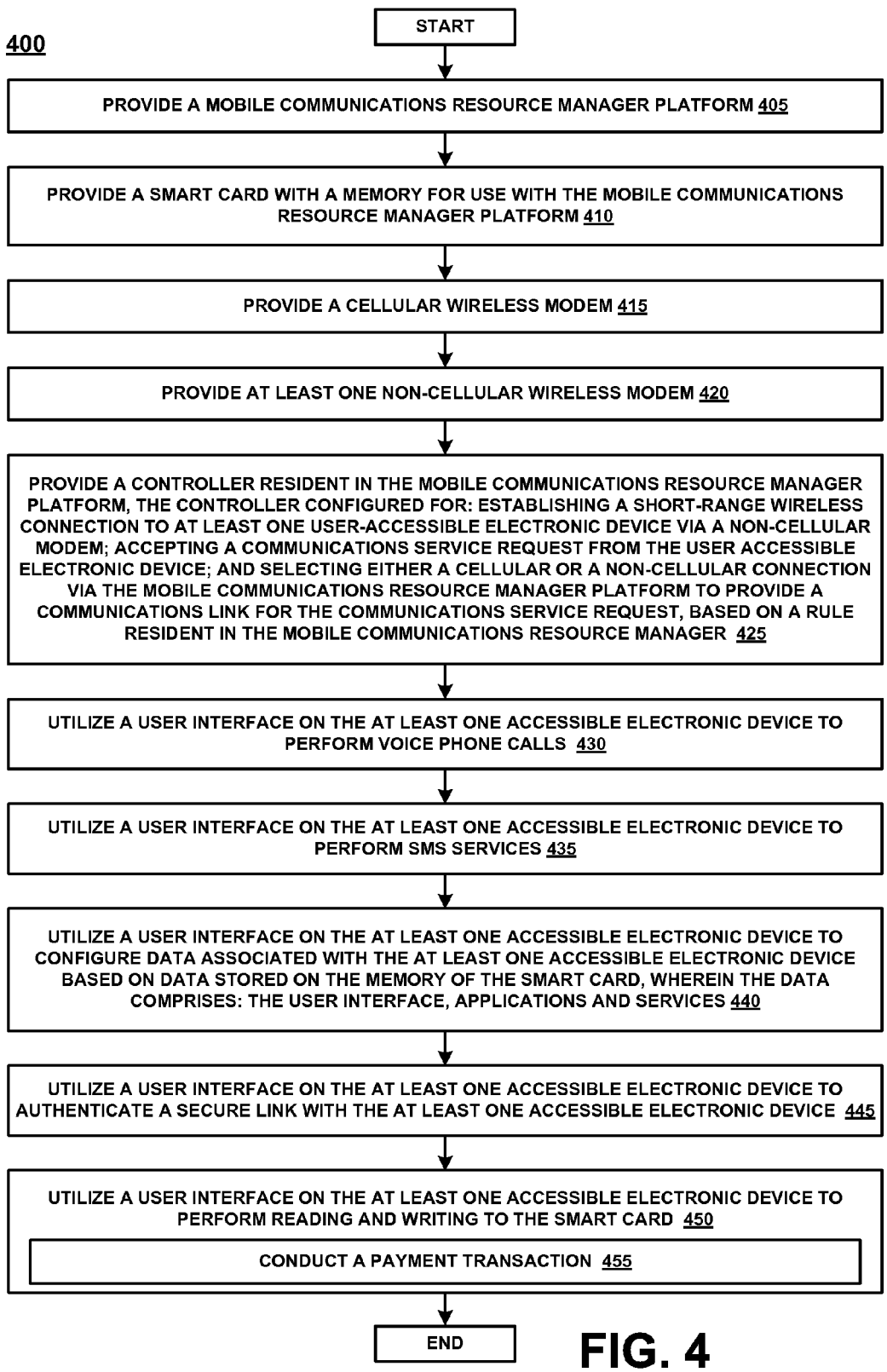
FIG. 4 is a flowchart of a method for managing connections from mobile user accessible electronic devices to a server of interest via a plurality of wireless communications links, in accordance with embodiments of the present technology.

Referring now to FIG. 4, a flow chart 400 of a method for managing connections from UAE devices 222 to a server of interest via a plurality of wireless communications links 236 is shown in accordance with embodiments of the present technology.

Referring now to 405 of FIG. 4, in one embodiment, a mobile communications resource manager platform is provided. Referring now to 410 of FIG. 4, in one embodiment, a smart card 204 with a memory for use with the mobile communications resource manager platform is provided.

Referring now to 415 of FIG. 4, in one embodiment, a cellular wireless modem 210 is provided. Referring now to 420 of FIG. 4, in one embodiment, at least one non-cellular wireless modem is provided. Referring now to 425 of FIG. 4, in one embodiment, a controller 214 resident in the mobile communications resource manager platform is provided. The controller 214 is configured for: establishing a short-range wireless connection 220 to at least one UAE device 222 via a non-cellular modem 212; accepting a communications service request 228 from the UAE device 222; and selecting either a cellular or a non-cellular connection via the mobile communications resource manager platform to provide a communications link 236 for the communications service request 228, based on a rule 238 resident in the smart card 204 memory.

Referring now to 430 of FIG. 4, in one embodiment, a user interface 224 on the at least one UAE device 222 is utilized to perform voice phone calls.

Referring now to 435 of FIG. 4, in one embodiment, a user interface 224 on said at least one UAE device 222 is utilized to perform SMS services.

Referring now to 440 of FIG. 4, in one embodiment, a user interface 224 on the at least one UAE device 222 is utilized to configure data associated with the at least one UAE device 222 based on data stored on a memory of a smart card 204, wherein the data comprises: the user interface 224, applications and services.

Referring now to 445 of FIG. 4, in one embodiment, a user interface 224 on the at least one UAE device 224 is utilized to authenticate a secure link with the at least one UAE device 222.

Referring now to 450 of FIG. 4, in one embodiment, a user interface 224 on the at least one UAE device 222 is utilized to perform reading and writing to the smart card 204.

Referring now to 445 of FIG. 4, in one embodiment, the reading and writing to the memory (secure element) and/or the smart card 204 includes conducting a payment transaction.

Figure 5:
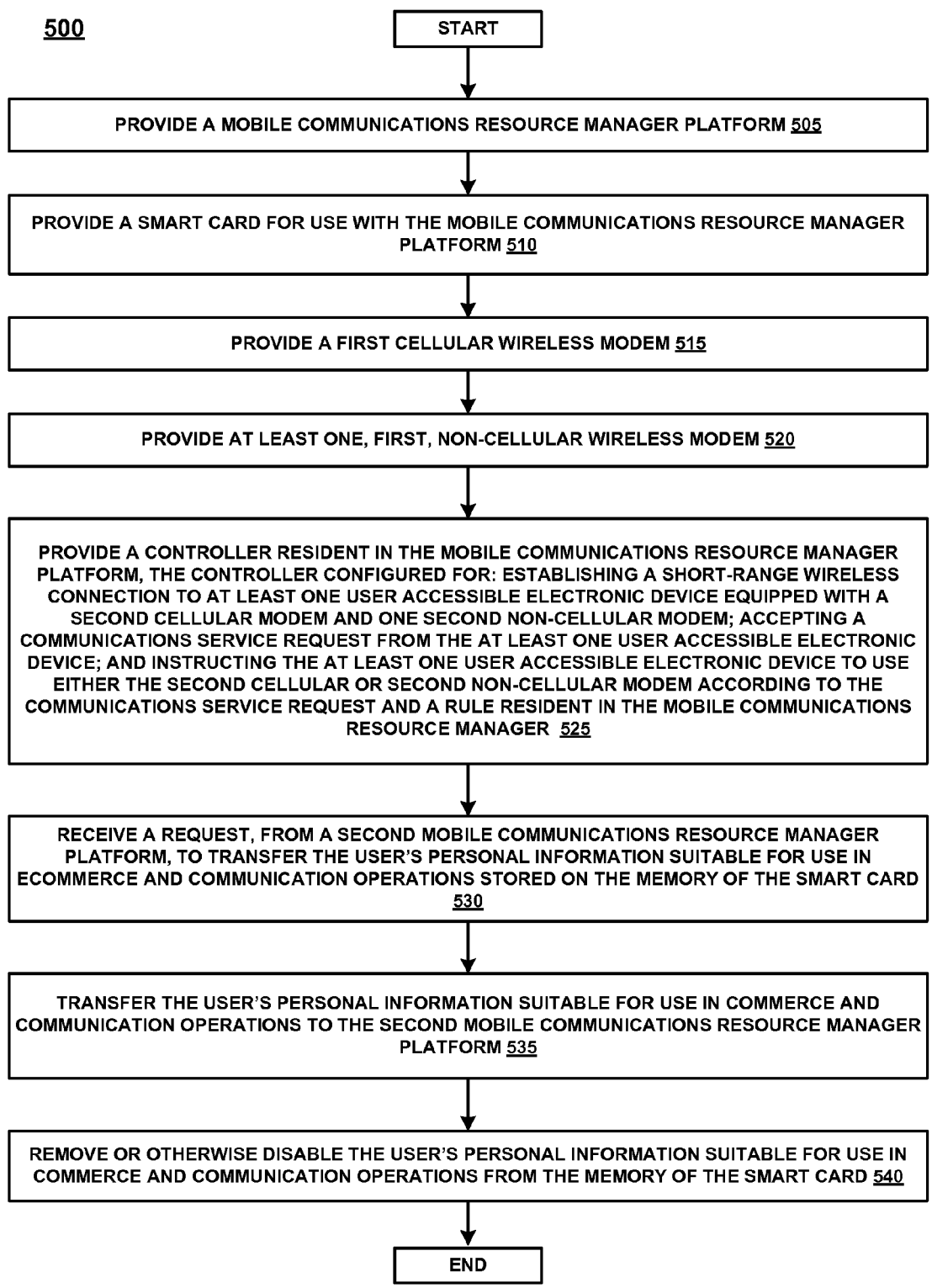
FIG. 5 is a flowchart of a method for managing connections from mobile user accessible electronic devices to services of interest via a plurality of wireless communications links, in accordance with embodiments of the present technology.

Referring now to 500 of FIG. 5, a method for managing connections from mobile UAE devices 222 to services of interest via a plurality of wireless communications links is shown, in accordance with embodiments of the present technology. It should be appreciated that not all the steps in 500 must be carried out to practice embodiments of the present technology. Additionally, the steps in 500 are not required to be carried out in the order demonstrated. Referring now to 505 of FIG. 5 and as described herein, in one embodiment a MCRM platform is provided. Referring now to 510 of FIG. 5 and as described herein, in one embodiment, a smart card 204 is provided for use with the MCRM platform.

Referring now to 515 of FIG. 5 and as described herein, in one embodiment a first cellular wireless modem is provided. Referring now to 520 of FIG. 5 and as described herein, in one embodiment at least one, first, non-cellular wireless modem is provided. Referring now to 525 of FIG. 5 and as described herein, in one embodiment a controller 214 resident in said MCRM platform is provided. The controller 214 is configured for the following: establishing a short-range wireless connection 220 to at least one UAE device equipped with a second cellular modem 210 and one second non-cellular modem 212; accepting a communications service request 228 from the at least one UAE device 222; and instructing the at least one UAE device 222 to use either the second cellular or second non-cellular modem, 210 and 212 respectively, according to the communications service request 228 and a rule 238 resident in the MCRM 200 memory.

Operations for Linking two MCRMs

In one embodiment, 505, 510, 515, 520, and 525 are employed with 530, 535, and 540 to pair a first mobile communications resource manager platform to a second mobile communications resource manager platform. Such a pairing may be used to switch from a MCRM platform to a second MCRM platform. Steps 505, 510, 515, 520, and 525 may be employed without completing 530, 535, and 540.

Referring now to 530 of FIG. 5 and as described herein, in one embodiment a request is received, from a second mobile communications resource manager platform, to transfer the user's personal information suitable for use in commercial transactions (physical tap or electronically) and communication operations stored on the memory of the smart cards 204 and 328.

Referring now to 535 of FIG. 5 and as described herein, in one embodiment the user's personal information suitable for use in commercial transactions (physical tap or electronically) and communication operations is transferred to the second mobile communications resource manager platform.

Referring now to 540 of FIG. 5 and as described herein, in one embodiment the user's personal information suitable for use in commercial transactions (physical tap or electronically) and communication operations is removed or in some way made inaccessible from the memory of the smart cards 204 of MCRM 200.

Operations for Choices in Communications Services

Figure 6:
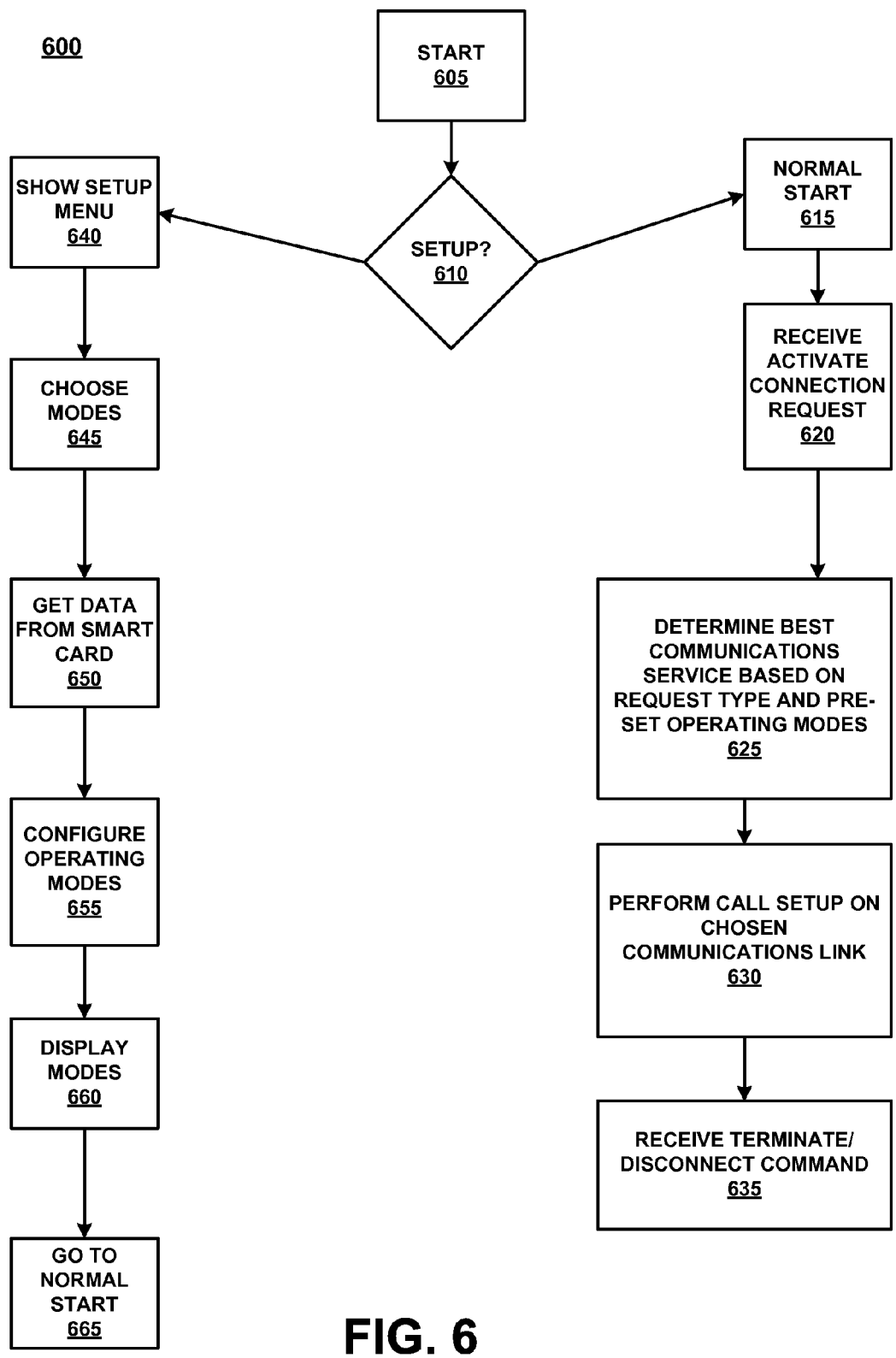
FIG. 6 is a flowchart of the communication services choices and the selection thereof, in accordance with embodiments of the present technology.
Figure 7:
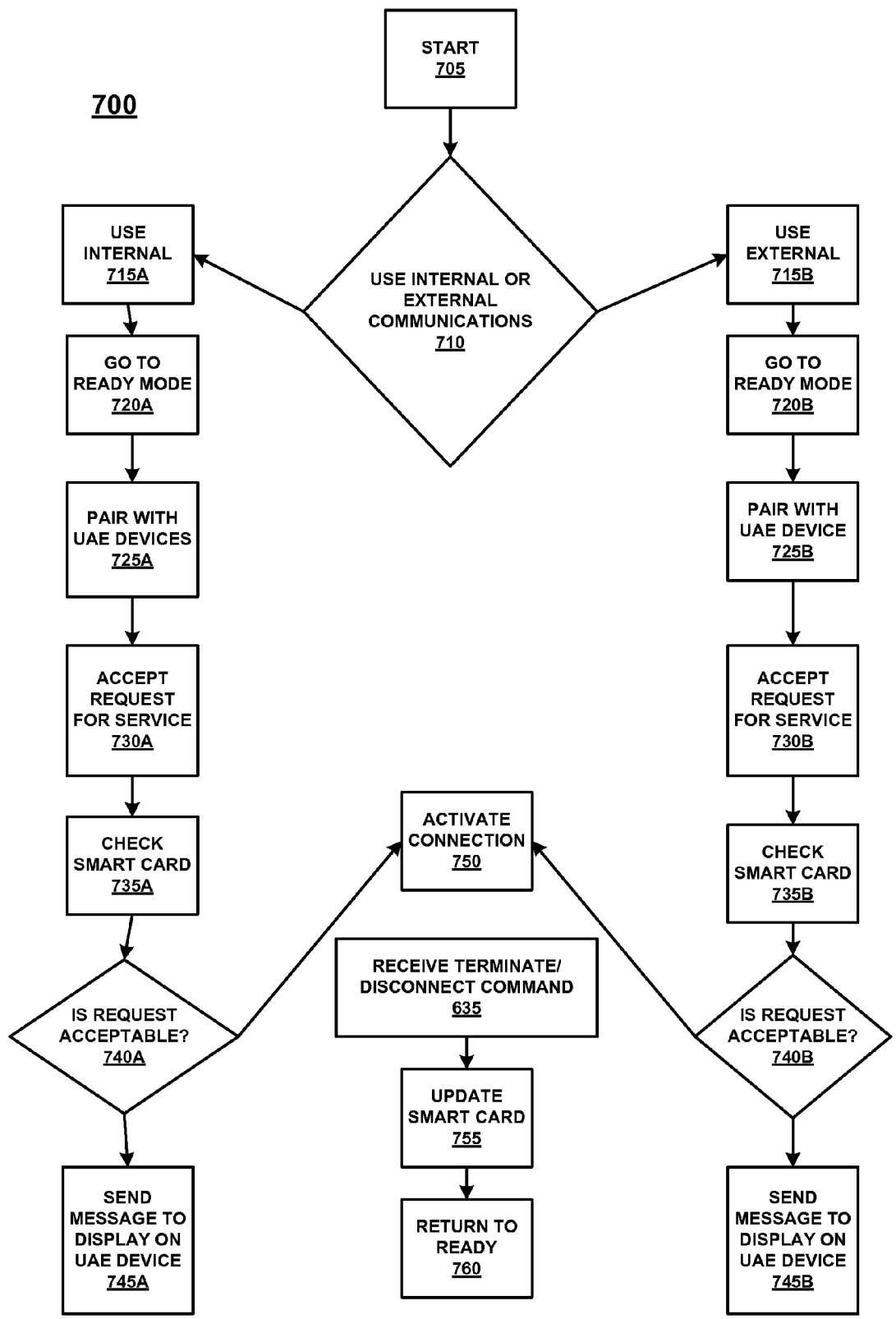
FIG. 7 is a flowchart of the process involving using internal communications operation versus using external communications operations to update a smart card, in accordance with embodiments of the present technology.

Referring now to 600 of FIG. 6, a flowchart of the communication services choices and the selection thereof, is shown in accordance with embodiments of the present technology. Flowchart 600 may be read in conjunction with flowchart 700 of FIG. 7. Flowchart 700 of FIG. 7 is a flowchart describing the operation of internal or external communications operations combined with the updating of the smart card 204 with respect to a specific UAE device 222. Referring now to 605 of FIG. 6, the method of selecting a communications service is started. Referring now to 610 of FIG. 6, in one embodiment, a determination of the presence of a communication service user preference system is made. If a user preference system is not in operation, then a normal start at step 615 is accomplished. However, if a user preference system is in operation, then a setup menu is shown, as in step 640.

Referring now to 620 of FIG. 6, an activation connection request is received at MCRM 200 (refer also to FIG. 7). Once activated, referring to 625 of FIG. 6, a selection of the best communications service is made, based on factors such as, but not limited to, the following: high performance to maintain high quality QoS; least costly; application rating based on local and/or remotely obtained metrics; and spectrum conservation. Referring now to 630 of FIG. 6, a call setup is performed based on the selected communications link. Referring now to 635 of FIG. 6, after the call setup is performed, a terminate/disconnect command is received.

Referring to 645 of FIG. 6, in the alternative, a user preference system is in operation, then an operation mode is chosen. Referring now to 650 of FIG. 6, data 216 from the smart card 204 is retrieved. This data 216 includes information 206 and rule 238 as described herein.

Referring now to 655 of FIG. 6, based on the information 206 and rules 238, an operating mode is configured. Referring now to 660 of FIG. 6, these operating modes are then displayed on the UAE device 222. Referring now to 665 of FIG. 6, once the operating modes are displayed, the system moves to "normal start".

Operations for Updating a Smart Card

Referring now to 705 of FIG. 7, the process of updating the smart card 204 with, for example, configuration information, is begun. Referring now to 710 of FIG. 7, a determination of the use of internal or external communications operations is made. If internal communications operations are to occur, then the process proceeds to step 715a. However, if external communications operations are to occur, then the process proceeds to step 715b. Of note, the processes following the determination of internal or external communications operations are the same. Referring now to 720a and 720b of FIG. 7, once the determination is made that either an internal or external communications operations is to occur, then the MCRM 200 switches to the "ready mode".

Referring now to 725a and 725b of FIG. 7, the MCRM 200 is paired with a UAE device 222, through the process described in FIG. 1 at 112 and 114. Next, and referring to 730a and 730b of FIG. 7, the MCRM 200 accepts 230 a service request 228. Now referring to 735a and 735b, the smart card 204 is checked, including the information 206 and rules 238. Referring now to 740a and 740b of FIG. 7, if the MCRM 200 finds the service request 228 acceptable as it complies with the information 206 and rules 238 comprising the smart card 204, and information 206 and rules 238 comprising the memory 232 then the a connection to a target 240 is activated. The target 240 may include, but is not limited to the following: service; people; and information.

However, and referring to 745a and 745b of FIG. 7, if the service request 228 is not acceptable, then a message is sent to be displayed on the UAE device 222.

As per 625 and 630 of FIG. 6, once a connection is activated, a determination may be made as to the best communications service to be used. A call setup is then performed on the selected communications link. As per 635 at FIG. 6 and FIG. 7, a terminate/disconnect command then may be received.

Referring now to 755 of FIG. 7, once the terminate/disconnect command is received at 635, then the smart card 204 is updated with the selected communications link. Referring now to 760 of FIG. 7, the MCRM 200 is then returned to a ready mode in preparation to be paired again with an UAE device 222.

Further, one embodiment provides a method of connecting to a mobile communications network for telephony services, such as, but not limited to, voice and short messaging service. Another embodiment provides a method of operating a smart card that can store not only the typically provisioned subscriber information required to access the mobile communications network, but also provides a method of storing or securing the user's personal information and credentials and applications preferences.

Another embodiment provides a method of providing device and user specific unique identifiers, such as secure tokens, passwords and personal identification numbers, to authenticate secure wireless transactions to linked external devices and network based services. Yet another embodiment provides a method of providing a user specific application program interface to transfer stored information to a linked external device and network based services.

In another embodiment, a secure method of executing or modifying applications, servlets or applets when requested or triggered by a user, linked external devices or backend servers is provided. Further, another embodiment provides a method of supporting user or operator defined over the air (OTA) updates to the stored information, firmware and applications from backend services.

Transactions/MCRM Operation

One embodiment provides a method of making a high speed link necessary to transfer the data from the smart card (e.g., USB or Bluetooth), via USB or Bluetooth (e.g. Bluetooth 3.0), to one or more external devices that may have a robust human interface (for certain use cases). For example, certain use cases may involve only executing secure transactions with MCRMs 200 stored credentials that utilize a near field communication interface (e.g., a merchant point of sale [POS 130] device or RFID 140) in accordance with existing standards and methods for POS and/or tag reading transactions. Certain manufacturers may choose to utilize a keyboard or other gesture based interface instead of or in addition to a touch screen. In one embodiment, the user 208 may link the UAE device 222 to an external device that only has a keyboard and mouse interface, but is otherwise able to support telephony and Internet applications, application processors, memory, operating systems and other typical computer components.

Another embodiment provides a method utilizing the NFC 322 hardware of the MCRM 200 to interact with active or passive compatible elements (e.g., POS 130, Passive device 140, or Active device 150). The MCRM 200 can receive authorization from User 208 using the UAE 222 or the MCRM 200 user interface to activate the NFC 322 hardware. Once activated, the MCRM 200 can interact in the most compatible way with the device to either provide information 216 about User 208 to the active device 150 or to read information from the passive device 140 into the MCRM 200 and process it. In the former case, information provided to device 150 might cause device 150 to transact with other services of value to User 208. In the latter case, the MCRM 200 might take information from device 140 and transmit that information to tagging services 124 along with User's 208 identity information 216.

In one embodiment, tagging services 124 will translate that information into specific transactions with other service providers of interest to User 208 via various "networks" social or otherwise via Internet 116. Such services might include but not be limited to: social tagging, geo-caching, reviews, location services, couponing, etc.

Additionally, information relevant to the service provider might also be collected from the user when the MCRM 200 interacts with devices 130, 140 or 150. This information may be contextual to the intent of the aforementioned devices such as user comments, business ratings that could be collected from a simple UI on device 130, 140 or 150 or captured via UI on UAE 222. As an example, User 208 might activate their MCRM 200 to "tag" mode and tap an instance of device 140 that is located in a Café to post information about their whereabouts. Another instance might be that of a business with an interactive sign allowing User 208 to rate their experience with said business (e.g., like or dislike) where once tapped, the MCRM 200 would transmit that tag info and information 216 about User 208 to tagging service 124 to be exchanged, brokered or otherwise provided to the business perhaps directly or indirectly via other relevant services (e.g., OpenTable, Zagat, Urbanspoon, Yelp, etc).

Additionally, embodiments of the present technology provide a method of supporting telephony service applications and the associated user interfaces equivalent to a typical smart phone. Further embodiments of the present technology provide one or more high-speed broadband connection via Wi-Fi, Wi-Max, 3G, 4G, and other mobile broadband or Ethernet.

Another embodiment provides a method of performing near-field communications with a merchant point of sale as well as a method of offering data or an application program interface from the user's 208 smart card 204 or secure element 328 (with the user's 208 authentication or permission) that will fulfill the merchant, creditor and/or banking institution's requested transaction related information.

In one embodiment, a method is provided of either drawing power from a host external device, such as USB, or utilizing an on-board battery. The on-board battery may be a typical compact portable device battery or thin film battery material and energy harvesting techniques to support limited use. There may be a time in the future when the technology will allow thin film batteries, solar and/or energy harvesting techniques to support full functionality of a UAE device 222.

Another embodiment provides a method of supporting audio out and audio in to a wired or wireless headset attached to the device. Yet another embodiment provides a method of alerting a user to an occurrence of certain use cases when linked or not linked to an external device. For example, the embodiments of the technology can use a sound producing or vibrating element buzzer when power is available to alert a user to an incoming call when no device is linked and able to alert the user. Additionally, the embodiments of the present technology can use a buzzer to alert the user (when power is available) that an external device is requesting secure information from the user's smart card. On note and as previously discussed, the ultra-compact footprint is assembled such that it may be incorporated into or attached to wearable accessories.

Embodiments of the present technology enable the user 208 to use the interface on linked external devices to do, but not exclusively, one or more of the following: perform voice phone calls by, for example, being paired with an in-car display to provide the required hands-free phone experience while driving; perform SMS services; utilize voice services; utilize messaging and data services; configure a user interface, applications and services using their preferences and content stored on their smart cards 204 and/or 328; authenticate a secure link with external devices to give the user 208 confidence in sharing sensitive information such as, but not limited to, personal identification, addresses, credentials and credit/banking account information.

Embodiments of the present technology provide transparently through abstraction a method for providing radio resources to physically disparate, but either wired or wirelessly connected and linked UAE devices 222. These radio resources include but are not limited to the first cellular modem and radio 210 and the first near field communication modem and radio 322.

Embodiments of the present technology provide a method for allowing the user 208 to read and write to the smart cards 204 and 328 via a backend gateway or application on a linked external device. For example, the user 208 can write address book information to the smart card 204 or write an external location where the address book information is stored. In this example, the linked external device will then be able to, with the user's 208 permission, pull address book information from the MCRM 200 or from an external location such as an address for the user's Google Contacts™ account. In another example, the user 208 can write frequently used commerce payment transaction information to the MCRM 200, such as a billing and a shipping address. In a further example, the User 208 can authorize payment credentials to be written to the smart card 204 or 328 for use for commercial transactions. Conversely, it will be possible for the entity issuing the credentials (e.g., the Bank, or credit processor, transaction services manager (TSM) or other official entity) to modify or revoke said credentials with or without consent of the User 208 via OTA or interaction with a device such as a POS 130.

In this example, when the user 208 is conducting a payment transaction through a linked external device, the linked external device can request this information that is stored on the MCRM 200. Additionally, in this example, embodiments of the present technology allow the user 208 to define how the user 208 will permit this information to be shared, such as by entering a PIN into the linked external device that is requesting the information.

Embodiments of the present technology provide a method for allowing the user 208 to link to multiple external devices individually and simultaneously. For example, in an embodiment of the technology, a method is provided of allowing the user 208 to define linking to one or more external devices automatically without a password, and then require a password to link to others. A security model can determine what information is available to the multitude of paired and linked endpoints or UAEs 222 based on the security of the given connection to each UAE 222. For example, an insecure link to a given UAE 222 may only provide basic incoming call service or otherwise limited services to User 208 on that particular UAE 222, while a UAE 222 with a trusted link may allow access to more secure information such as personal information, credentials or other sensitive, secure data belonging to User 208 stored on MCRM 200. For example, a method is provided for allowing the user 208 to define specific characteristics of the interaction between the MCRM 200 and the linked devices (e.g., whether simultaneously linked devices all ring upon an incoming call or only on a specific device). These types of configuration are possible with the device but may require an external web service or the application on the connected user appliance(s) to operate.

In an embodiment of the present technology, a method is provided of allowing the user 208 to prioritize multiple linked external devices and to differentiate how information on their smart card 204 is shared with multiple external devices. For example, one embodiment provides a method for allowing the user 208 to identify some UAE devices 222 to synchronize and store some or all of the user's 208 contacts, and other UAE devices 222 to not synchronize or to not store the user's 208 contacts at all. In another example, one embodiment provides a method for allowing the user 208 to define whether a specific UAE device 222 has access to the user's bank account information or shipping address found on the MCRM 200. Another embodiment provides a method of requiring one or more authentication events to access that type of sensitive information.

Embodiments of the present technology give the user 208 control over the information stored on the MCRM 200 and encourage the user 208 to provide that information to multiple UAE devices 222 to increase transaction options utilizing a secure element (on the near-field communication modem 322) and improve the user interface experience. This method is in contrast to associating a secure element stored on the MCRM 200 with a specific cell phone interface and its applications.

UAE Description

In embodiments of the present technology, the MCRM 200 may be connected to a separate UAE device 222, which has one or more of the following five (5) components: a touch screen user interface; a mobile oriented operating system, or operating system designed to support, at a minimum, voice and data services and contact management; a high-speed data connectivity via Ethernet, Wi-Fi, WiMax, HSPA, LTE or other embedded high-speed data communication radio chip package; a Bluetooth radio for linking audio and data to the MCRM 200; and a microphone, speaker and/or audio in/out jack to support telephony voice sessions in conjunction with the ability to select the audio path for the call from the dialing application on the device (which would alert the device to support the path of the user's preference). The UAE device 222 will also (optionally) be loaded with the application allowing it to control and configure the MCRM 200.

In one embodiment, the link between the UAE 222 and MCRM 200 might utilize a multiplexer (or MUX) to separate the physical channel into multiple channels each used for specific operations (e.g., telephony, wallet, configuration, data, etc). In another related embodiment, some of these logical channels could be encrypted to provide additional security for sensitive operations. In an alternate embodiment, the link between the UAE 222 and MCRM 200 might be used such that all communications are co-mingled (or simplex communication). In yet another embodiment, the MCRM 200 resources (i.e., radios and secure elements) might appear as virtual hardware to the UAE 222 by creating virtual connections in the OS of the UAE and allow the UAE to treat the resources of the MCRM as if they were physically connected and part of the UAE device.

General consumer electronics (i.e. not cell phones) which have the first four components above, and definitely all five components, are capable of providing a mobile smart phone like user experience. These consumer and commercial electronics are able to present a user interface which substitutes for a traditional mobile phone screen and keyboard or touch screen. Dialing applications, contact management applications and other subscriber information/preferences management applications are presented to the user 208 on the linked external device's screen rather than a traditional mobile phone screen.

In one embodiment, mobile phones that run compatible operating systems may load applications similar to those used on basic tablet UAE in order to provide a "second line" service to the User 208. In one embodiment, separate dialer and messaging applications can be loaded by User 208 onto a compatible mobile phone that would provide access to services on the MCRM 200. In this way, a User 208 could avail of the native cellular communications capabilities using one number (e.g., a business number) as well as the MCRM 200 communications capabilities both cellular (e.g., a personal number) and NFC (e.g., wallet and "tagging").

The user 208 is presented with a browser or application based interface from any terminal connected to a backend gateway so that they can update information stored on the MCRM 200 using Over The Air (OTA) update tools. In the alternative, MCRM 200 updates can be managed from applications presented on the linked external device. Authorized third parties can also conduct OTA updates to the MCRM 200.

Software available to the operating system (OS) will provides an interface in order to provide Internet access to, either via a wired or wireless link as determined by the connection manager, linked external devices and to provide for a method of retrieving information (such as an application programming interface [API] from the MCRM 200). The linked external device may then retrieve Internet data via its broadband connection. Through this retrieval of Internet data, services and applications such as voicemail, email, SMS, MMS, purchased content and preferred web content are synchronized and/or updated Software available to the OS will provide an interface in order that the paired device has a method for retrieving information from the device. For example, the linked external device uses an API from the MCRM 200 for example, in order for the linked external device to display user information stored on the device. More examples are disclosed herein.

Possibly using an API from the MCRM 200, the smart card 204, or smart card 328, software available to the OS will provide an interface allowing the external linked device to retrieve information, using with any user 208, operator or manufacturer defined configuration settings defined for the paired UAE device 222. By using the defined configuration settings, its components may be properly utilized in conjunction with functions, services and applications requested by the user or UAE device 222.

Functions of software include the following: the ability to control and configure the MCRM 200; the ability to manage a mobile wallet (including transaction history, prepay balances, select card for transaction, display inline advertising, act as user interface for authentication if needed); the ability to read (active mode) or be read (passive mode) via the NFC 322 radio and to thus interact with devices 130, 140, or 150 (e.g., social tagging, rating, or other transmission of information to other services of interest directly or via tagging service 124); the ability to perform in call control (including selection of audio path, mute, hold, 3-party, call waiting, dialing (from pad, PIM, recents); and the ability to display device history (message inbox, outbox; call logs—recent/missed).

Current smart card designs using plastic card housing are larger than the footprint of GSM radio access technology. GSM radio access technology will continue to shrink in size and costs. In parallel, other short distance radio access technologies on chip are also shrinking in size and power requirements. In an embodiment, the package size of the mobile communications resource management system allows it to be incorporated in wearable accessories that users can secure to themselves and do not have to move frequently to use like a cell phone. The ability to reduce the user interface 224 with the device and secure it on their person will increase consumer confidence in maintaining more personal information within the device. One view is the device has a better advantage at replacing personal information that is found in wallets and purses.

Separating multiple radio access technologies from form factors driven by screen and keyboard sizes will encourage consumers to choose new interfaces that meet their personal or commercial needs while retaining one personal radio access point and a single source of their personal information on a device MCRM 200 with smart cards 204 and 328. For example, eReaders, Internet tablets, personal media players, in-car displays, computer displays and possibly future television displays, may all be UAE devices 222 a consumer would like to utilize at any given time without searching for a separate cell phone interface to utilize telephone services. Consumers could choose future public or commercial touch screens such as POS devices, public screen kiosks or large touch tabletop surfaces to conduct telephony, commerce or information transactions with minimal interface on this device. The distinct advantage of these UAE devices 222 can be a larger screen size than smart phones, which are limited to the size of the hand, and higher data rates if connected to cable, fiber, Wi-Fi or a dedicated mobile broadband network.

Bundling radio access technology with screen, keyboard, computer processors and related computer components creates a duplicative consumer electronics costs to consumers who desire other computer and screen technology. Additionally, this bundling is a barrier to general consumer electronics manufacturers who must gain approval from mobile network operators (MNO) for each device with embedded MNO radios. To date, MNOs have only offered consumer unbundled radios with data access plans and limited connectivity to specific operating systems and computers.

Currently in the U.S., MNOs are allowing unlocked GSM devices into their network, which means this device may be rapidly deployed. Furthermore, it is the standard business practice of the industry in 2010 to allow unlocked devices on their network. As of November, 2009, T-Mobile of Bellevue, Wash., for example, released smart card only full service no-contract rate plans and announced an MVNO that asks consumers to purchase a smart card only plan with no-contract and supply their own phone.

Thus, the MCRM system gives consumers the advantage to purchase low cost radio access from the MNO with no contract and then purchase a competitively priced alternative touch screen ultra portable or other touch screen device from a general consumer electronics manufacturer and use it with the MNOs network.

A related advantage is that without the need for carrier approval of all devices on their network, the time and approval process to market for new innovation of smart devices is reduced. Further, expanding radio access to all consumer electronics companies with one product will increase competition amongst ultra portable and touch screen technologies and result in increased innovation and lower costs to consumers.

General consumer electronics companies not currently building cell phones or who have only a small number of cell phones in their portfolio will be able to offer consumers a larger number of alternative touch screen computers without an embedded mobile network operator radio access and still configure their device to the consumer's personal preferences.

In one embodiment of the present technology, screen size technology and radio access technology are separated. Smart phone screen size is effectively limited to the size of the hand today. Separation will accelerate consumer's ability to choose different screen size and screen type experiences directly from manufacturers innovating in that space. Consumers may choose different screen devices throughout a day depending upon their situational need without disconnecting their mobile telephony services or carrying a second screen and keyboard embodied in a typical cell phone.

Consumers can own multiple touch screen devices and utilize mobile communications and their personal subscriber information without swapping smart cards. As an embodiment of this invention, the MCRM 200 allows the user 208 to make and receive phone calls using a single MSISDN (phone number) from any number of UAE devices 222 (or end points that provide a user interface). By using low cost components, larger memory smart cards with backend server user control, in a device designed to connect with high performing electronics and merchant point of sale systems, consumers are able to securely keep personal information related to all sorts of transactions in one object.

The MCRM 200 allows the user 208 to consistently authenticate a plurality of other personal and commercial electronics devices in order to access the user's 208 personal information, application preferences and services preferences via the wireless pairing connection to the MCRM 200. The user 208 then uses those other UAE devices 222 to utilize telephony services via the operating system's radio access software and technology.

Consumers will have more choices in the purchasing of a device that can act as their mobile phone. Consumers will be able to leverage more of the consumer electronics they purchase to give them the mobile phone functionality.

Embodiments of the technology at least partially address the pending spectrum crisis by creating a new mobile device ecosystem that shifts the burden onto licensed spectrum broadband. Firstly, it will help shift the burden to Wi-Fi only devices. Secondly, it will give smaller MNOs and data only networks like Clearwire of Kirkland, Wash., the opportunity to look outside the traditional handset ecosystem for highly competitive consumer devices that will attract more mobile broadband users to their spectrum. The problem is that smart phone penetration on mobile operator networks will create data demand that exceeds spectrum capacity. Using Wi-Fi and similar wireless networking technologies are critical to avoiding the spectrum crisis.

Embodiments of the technology may lead to modifying how consumers view a smart phone versus a "smart device." The MCRM 200 separates in the consumer's mind the already affordable mobile voice services from MNO-subsidized smart phones that are sold with bundled data plans. Once separated, general consumer electronics and computer manufacturers and smaller operators can better compete with Wi-Fi only or data services offered on other networks with available spectrum.

The MCRM 200 allows general consumer manufacturers to compete for a position as the consumer's primary portable device by connecting with a small wearable mobile voice accessory. Whether a student buys a mini-PCs, a commuter carries an eBook or a hiker wants to just bring their GPS unit, the MCRM 200 is a small enough accessory that consumers can choose a device that fit their specific need from a larger number of competing manufacturers while keeping that essential mobile connection when they are away from home. Further, manufacturers have an option to adjust any number of their overall SKUs to work with the MCRMs 200, rather than work with the MNO to get approval of one or two SKUs to a year.

From another perspective, a smart phones may be described as an ultra-portable computers layered on top of radio access technology. The MCRM 200 gives ultra-portable computer manufacturers outside the handset-manufacturing ecosystem a means to compete for customers that want mobile telephony services on their ultra portable.

Mobile banking growth is stymied by MNO control over the handset ecosystem, because MNOs control the mass deployment of NFC technology on mobile phones and the critical smart cards contained inside. MNO are making efforts to determine their revenue model for mobile banking This device gives a low-cost rapid deployment option of NFC that potentially removes the MNO from the equation.

Many services such as Facebook™, have experimented with deploying NFC compatible devices that allow users to "tag" into locations and post to their "Wall" using passive RFID based devices or trinkets. The MCRM 200 could reverse this model by providing the User 208 with ability transmit information to a service directly or via a tagging service 124 that would allow businesses to install low cost RFID tag based infrastructure in many locations that include even the basics of a "UI" or choices (e.g., like or dislike). The User can thus interact with these devices through their day to publish information about themselves, their location, or business ratings as well as for businesses hosting these devices to receive feedback from users and obtain information about their consumers.

Thus, mobile banking tools like Near Field Communications (NFC) lead to higher conversion rates at the point of sale. Today, consumers are asked to enter their account and personal information when making web based or mobile-based purchases. Results show that the more information requested, the lower the conversion rate at POS. Tools like "OneClick" where the consumer fills out the information once, or NFC connected to a smartcard that transfers the information for the consumer, resulting in a higher conversion rate. Placing the smart card in a low cost, easy to wear device that gives consumers one place to populate all necessary personal information will increase conversion rates in commercial transactions (physical tap or electronically).

In an embodiment, the MCRM 200 may provide a communications path from the UAE device 222 in the local vicinity of the user 208, via one of several radio modems resident in the MCRM 200, making the connection to the selected service via a cellular link or a non-cellular link.

In an embodiment, the MCRM 200 may control another radio modem resident in the UAE device 222 to establish a communications data path from UAE device 222 to the user's selected service, via either a cellular link or a non-cellular link, not passing through the radio modems of the MCRM 200. These functions may be controlled or managed via a software application on the UAE devices 222 working in conjunction with and under control of the MCRMs 200.

In an embodiment, the MCRM 200 may contain more than one non-cellular radio modems 212 for making connections to other services, including WLANs, Wi-Fi, Wi-Max, Bluetooth, Near Field Communication or any other such non-cellular communications systems.

In an embodiment, the rules for spectrum management includes but is not limited to at least one of the following: making a radio modem choice based on the needs of the user-selected service request; making a modem choice based on a user-selected Quality of Service (QoS) metric; making a modem choice based on a conservation of spectrum metric; making a modem choice based on a user preference; and making a modem choice based on a pre-programmed methodology to automate the procedure, without user decision making In an embodiment, the rules for spectrum management may include choosing a non-cellular modem whenever possible, according to Internet availability of a connection to the user 208 requested service 228 and Internet availability via a non-cellular radio modem 212 connection.

In an embodiment, the rules 238 for spectrum management may include accessing a monitoring function resident in the radio modem to assess a quality of service metric; evaluating that metric; if the service metric indicates an inadequate level of service based on either customer preferences or on the service provider's needs, making a decision to switch to another communications service via a second radio modem if available.

In an embodiment, the rules for spectrum management may include choosing non-cellular radio modems 212 for a specific communications service according to a sharing agreement between said specific communications service provider and the user's selected cellular service.

In an embodiment, the MCRM 200, using the smart card as the secure element, is configured to synchronize cloud services-based stored data to multiple user appliances, where each appliance has its own set of rules.

In an embodiment, the MCRM 200 is configured to synchronize cloud services-based stored data simultaneously without any connection from the MCRM 200 to any UAE device 222.

In an embodiment, the cellular modem resident in the MCRM 200 may consist of a software-defined radio (SDR) 244, in which a generic chip set (silicon integrated circuits) uses an operating system particular to the cellular provider chosen by the user 208 to operate the silicon chip set in a manner identical to what could be provided by a complete cell phone handset made by that supplier. In addition, the software-defined radio 244 can be reconfigured to operate in a manner determined by another cellular provider's chipset and operating system. In this manner, the SDR resident in the MCRM 200 is reconfigurable without any need to change hardware, i.e., to change the chipset.

In various embodiments, a radio interface layer resident on the UAE devices 222 shall provide an abstraction layer to open source developers, allowing them to utilize the same or similar methods to create/manage/destroy logical communications resources as in a traditional cellular phone device. This shall allow for the portability of applications targeted to the same Operating System (OS) as the UAE devices 222 that expect or require radio resources. This applies to all resources of the MCRM 200 (i.e., secure elements and radios).

An assembly of radios to access a mobile network, connect to other devices via Bluetooth (including a high speed Bluetooth 3.0 connection, which works with a Wi-Fi radio) and perform near field communication contactless payments will all fit in a compact footprint of a smart card. Additionally, the assembly cost is low, comparable or lower than the assembly cost of a basic entry-level phone. This will allow the MCRM 200, even with an on-board rechargeable battery or USB connection included, to be incorporated into wearable forms that consumers can confidently secure to themselves, their clothing and/or their accessories.

Embodiments of the present technology may wirelessly connect to a variety of other transaction points found in a consumer's daily life from airport security (e.g., boarding passes or transit ticketing) to unlocking and starting a car (e.g., keychain).

In one embodiment, the present technology comprises a portable, mobile communications resource management system resident in a small package, including a microprocessor controller, a cellular radio modem, at least one other non-cellular radio modem, a Smart Card (SIM), an operating system configured to accept information from a personal smart card, a power supply, and a minimal user control interface.

The smart card 204 is configured to contain communications management resource rules for initiating communications from other separate user appliances, based on a multiplicity of options, both user-determined and Mobile Network Operator (MNO)-determined, according to what the user has arranged with the MNO or other communications service supplier. Either smart card 204 and/or 328 are further configured to accommodate the owner and/or user's 208 needs for entering into a variety of transactions available from vendors, either in an immediate vicinity of the user or available via an Internet connection, direct cellular connection, or other non-cellular communications links.

The rules and other configuration information may be located in the UAE device's 222 internal memory or onboard the smart cards. In either case, the information may be cryptographically encoded to provide security using the smart cards as the secure element or a security token housed therein to allow the user or system to access rules and other configurable information used as credentials, rules or personal information.

Figure 8:
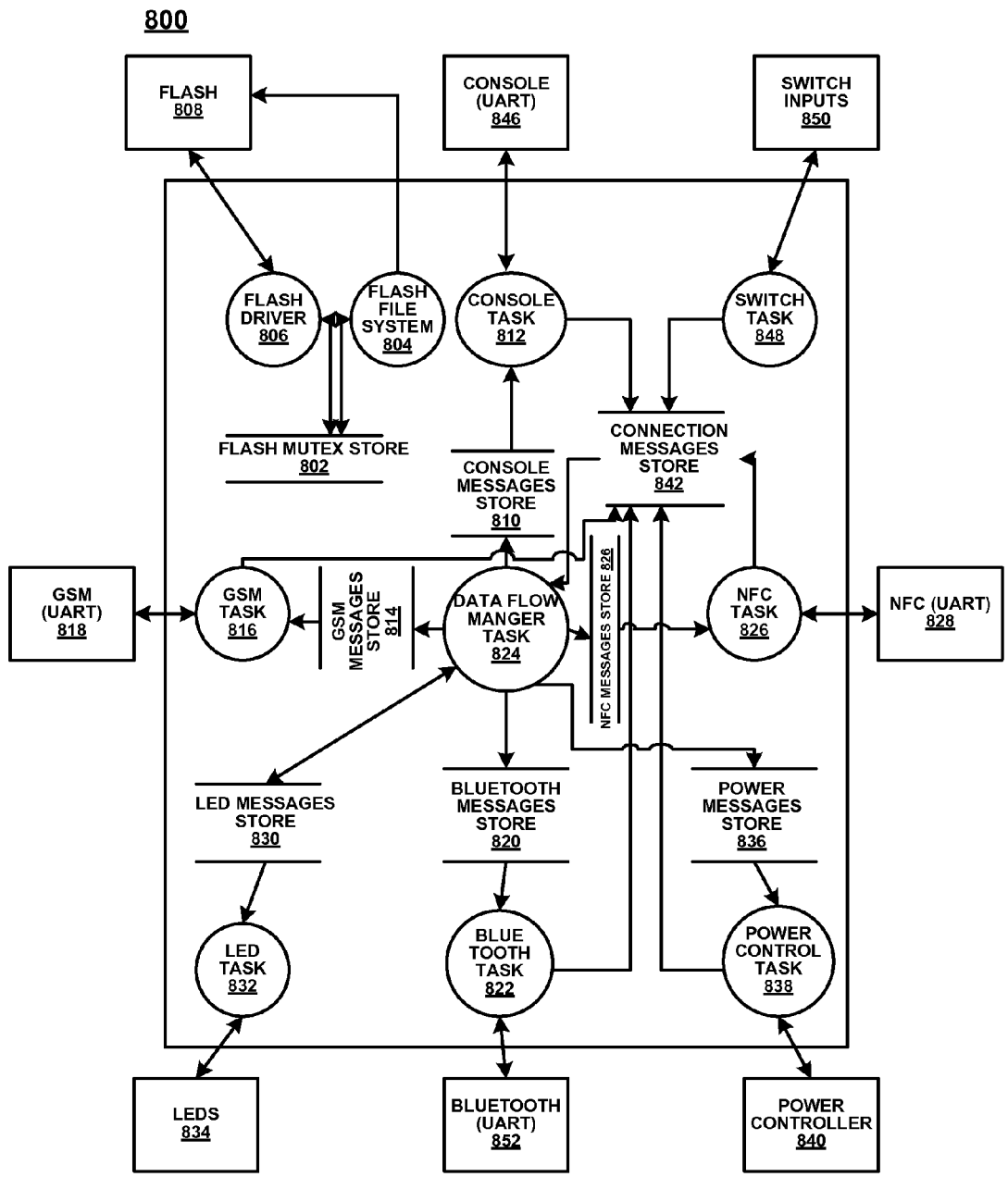
FIG. 8 is a block diagram of a top level of data flow for a mobile communications resource management system, in accordance with embodiments of the present technology.
Figure 9:
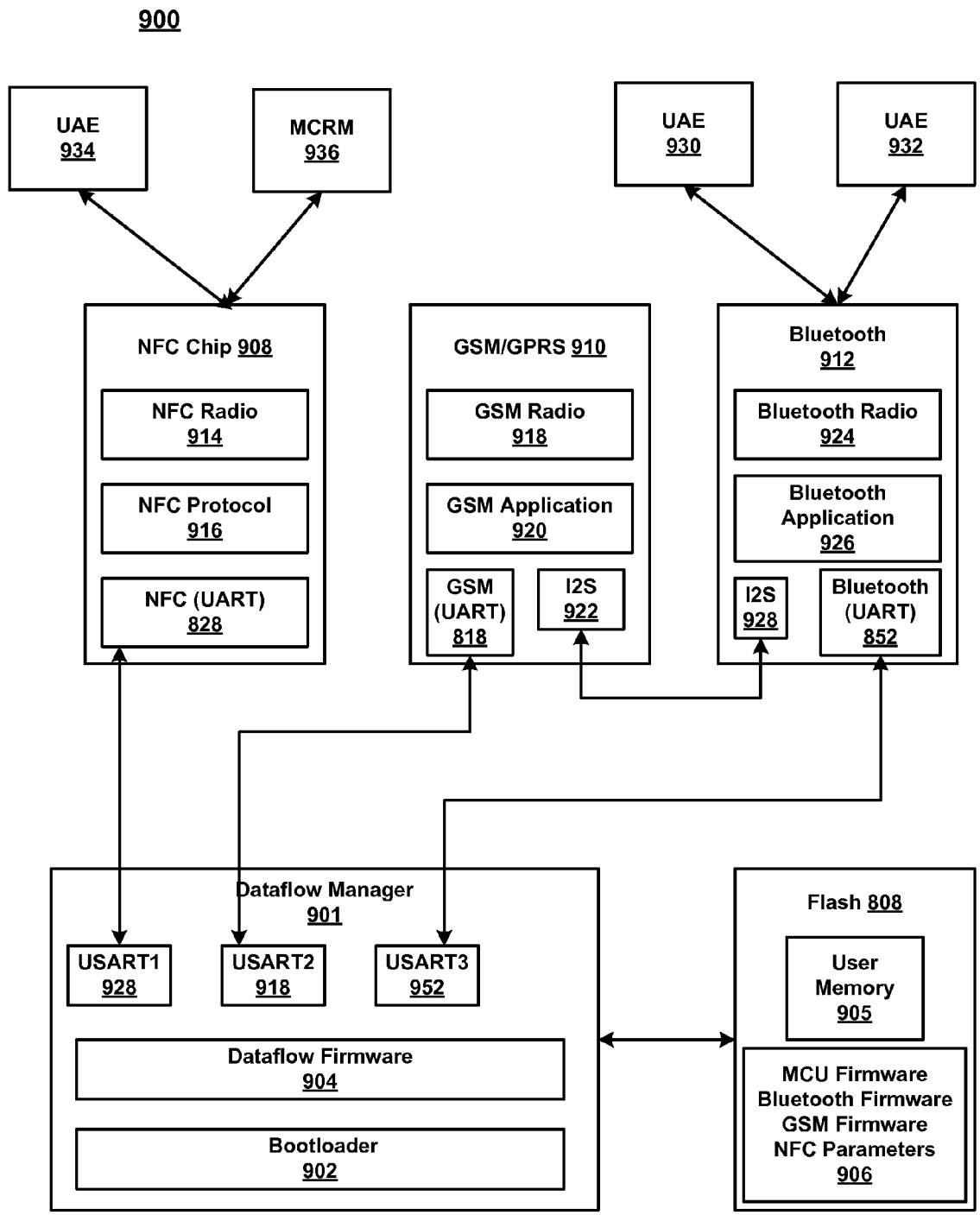
FIG. 9 is a block diagram of a system architecture, in accordance with embodiments of the present technology.

In one embodiment, the near field communication modem 322 is controlled by a dataflow firmware 904. Referring now to FIGS. 8 and 9, with attention directed towards 900 of FIG. 9, a system architecture including a dataflow manager 901 is shown in accordance with embodiments of the present technology. A dataflow manager 901 includes two major pieces of firmware: the bootloader 902 and the dataflow firmware 904. In one embodiment, the bootloader 902 validates any present dataflow firmware image, loading a new firmware image if one is present in a flash 808, and booting the dataflow firmware 904. The bootloader 902 is not capable of any external interaction other than through the console (UART) 846, which is not available to the end user 208. All firmware images must be received and stored in flash 808 by the dataflow firmware 904.

The dataflow manager is the top level of the dataflow firmware 904, and includes several tacks that interact to monitor and control the various hardware devices in the MCRM 200 platform. It includes four tasks that control the near field communication modem 322, as well as the console (UART) 846, GSM (UART) 818, and the Bluetooth (UART) 852. A fifth task manages connections, passing data between the tasks, and other supervisory functions. A sixth task manages the external power controller 840. Three other control modules manage the flash 808, switch inputs 850, and light emitting diode (LED) 834.

Referring still to FIG. 8, a top level of the dataflow firmware 904 is shown in accordance with embodiments of the present technology. In one embodiment, there are at least eight dataflow stores in the top level of the dataflow firmware 904: Flash Mutex Store 802; Consol Messages Store 810; GSM Messages Store 814; Bluetooth Messages Store 820; NFC Messages Store 824; LED Messages Store 830; Power Messages Store 836; and Connection Messages Store 842. These data stores represent storage locations of information and data that flows between the tasks and control blocks. The details of the format, type and size of these data stores are not defined at this level. However, all message stores are queue-like in nature, in that all received messages are processed in the order received.

Of note, there is no data store between the dataflow manager task 824 and the flash file system 804. This is because the flash file system 804 presents itself as an API to the application, rather than as a data interface. Similar to the flash file system 804, the access to the flash driver 806 is API based, rather than a data interface.

Flash Mutex Store 802: In one embodiment, this store is a mutual exclusion store that limits access to the flash 808. The flash mutex 802 limits access to ensure exclusive access. Note that in order to read the flash 808, the flash mutex 802 need not be locked. However, if a flash erase/write cycle is in process, any reads will be corrupted. Thus, this flash mutex 802 should lock whenever flash 808 access is necessary.

Console Messages Store 810: In one embodiment, this store holds messages destined for the console task 812. These messages are typically used only for debugging purposes, and include captured data to display, status changes, and other debug output.

GSM Messages Store 814: In one embodiment, this store hold messages destined for the GSM task 816. These messages are used to request services from the GSM task 816, such as GSM status, power control, dialing, and transmitting SMS/MMS messages. It is also used to pass raw GSM messages to the GSM (UART) 818 (such as raw GSM commands from a remote device connected via the SPP profile).

Bluetooth Messages Store 820: In one embodiment, this store holds messages destined for the Bluetooth task 822. These messages are used to request services from the Bluetooth task 822, such as Bluetooth status, power control, opening/closing Bluetooth connections, querying available remote devices, setting Bluetooth authorization codes, and transmitting data.

Near Field Communications Messages Store 824: In one embodiment, this store holds messages destined for the NFC task 826. The types of messages are not yet known as there needs to be investigation into how to handle the NFC (UART) 828 side of things for POS interactions.

LED Messages Store 830: In one embodiment, this store holds LED output requests destined for the LED task 832. This store holds the LED status (on/off/periodic blink/a periodic blink) and color for each supported LED 834.

Power Messages Store 836: In one embodiment, this store holds power management requests destined for the power control task 838 for the power controller 840. These requests include charging status and battery level.

Connection Messages Store 842: In one embodiment, this store holds messages destined for the dataflow manager task 824. All modules communicate with the dataflow manager task 824 via the connection messages store 842 by publishing events and data. From this store, the dataflow manager task 824 processes these events and processes.

The discussion will now turn to tasks, drivers and control. The term "task indicates a separate execution context maintained by uCOS-II™ of Micrium of Weston, Fla. The term "driver" indicates a separate execution context, but limited in processing to that of interfacing with a hardware device. The term "control" indicates code that executes within another task's execution context.

Flash driver 806: In one embodiment, this is the interface to the flash 808 for OTA firmware images. This task takes request from flash buffer and performs writes and erases as requested. Before any erase or write operation, the flash mutex 802 is locked to prevent conflict with the flash file system 804. This driver is tuned to the specific flash part, and all erases/writes occur on sector boundaries.

Flash file system 804: In one embodiment, the flash file system 804 is a third party product (uC/FS™ from Micrium of Weston, Fla.). It is integrated with the uCOS-II™ (from Micrium of Weston, Fla.) operating system. It provides an API for reading/writing files to the flash 808. It comes with a specific driver for the flash 808. Before all erase/write access to the flash 808, the flash file system 804 will lock the flash mutex 802. This protects against contention with the flash driver 806.

Console Task 812: In one embodiment, the console task 812 provides a user interface and debug output. It takes messages from the dataflow manager task 824 (usually debug messages) for display to the user 208. It also manages all data from the console (UART) 846, sending events to the dataflow manager task 824. The console task 812 provides the following features: command line interface; system status (e.g. GSM status, connection status, task information); system control (e.g. power-on/power-off, injection of GSM/BT commands); system reset; OTA firmware image control (erase, download, status); bootloader image control (erase, download, status); and debug output.

Note that in the case of the OTA firmware and bootloader image control, all messages are passed to the dataflow manager task 824 for processing.

Switch Task 848: In one embodiment, the switch task 848 monitors and debounces the switch inputs. It identifies which button and type of press (press, hold, double tap, etc.). When a press, hold, etc. is detected, it is published to the connection messages store 842 for processing by the dataflow manager task 824.

LED Task 832: In one embodiment, the LED task 832 reads the LED Messages Store 830 and updates and maintains the status of the LEDs 834. The LED task 832 executes in the context of another task, and uses the system time to check for changes in the LED 834 status.

Power Control Task 838: In one embodiment, the power control task 838 manages the power controller 840. It monitors the charging status, updates the charging watchdog, and reads the battery level. It responds to requests from the dataflow manager task 824 and generates events to the dataflow manager task 824.

Near Field Communication Task 826: In one embodiment, the NFC task 826 handles the interaction with the NFC (UART) 828 chipset.

GSM Task 816: In one embodiment, the GSM task 816 processes requests from the dataflow manager task 824, generating the appropriate commands to the GSM (UART) 818. It also processes data from the GSM (UART) 818 and generates events to the dataflow manager task 824. The GSM task 816 supports the following dataflow manager task 824 requests: dialing; hangup; raw AT commands (This is used for passthrough mode from the SPP profile on the Bluetooth (UART) 852. However, the eventual mode of operation would be for the Bluetooth task 822 to process the SPP data and generate the appropriate requests through the dataflow manager task 824 to the GSM task 816.

The GSM task 816 generates the following events to the dataflow manager task 824: Incoming call (Ring); hangup; incoming phone number; raw output (any unknown or unexpected results from the GSM (UART) 818 will be passed back to the dataflow manager task 824 for eventual transport over the SPP connection. However, the eventual mode of operation would be for the dataflow manager task 824 to process or ignore such events); receive SMS/MMS (This will only be supported through the raw AT command mechanism in this design. The eventual mode of operation is for the GSM task 816 to recognize a new SMS message, then send them to the dataflow manager task 824 for further processing.

Bluetooth Task 822: In one embodiment, the Bluetooth task 822 processes requests form the dataflow manager task 824, generating the appropriate commands to the Bluetooth (UART) 852. It also processes data from the Bluetooth (UART) 852 and generates events to the dataflow manager task 824. The Bluetooth task 822 supports the following dataflow manager task 824 requests: remote device discovery; Bluetooth authorization code settings; pairing with a remote device; incoming call (Ring) via HFP-AG; Hangup; incoming phone number; and raw commands (The mode of operation is limited to the SPP interface. This is to support the passthrough path to the GSM (UART) 852 for SMS/MMS functionality). The Bluetooth task 822 generates the following events to the dataflow manager task 824: new connection; lost connection; dialing; hangup; and raw commands (This mode of operation is limited to the SPP interface. This is to support the passthrough path to the GSM (UART) 852 for SMS/MMS functionality).

Dataflow Manager Task 824: In one embodiment, the dataflow manager task 824 is the central hub of operation in the design. It has the following major roles: monitoring the GSM status; management and control of GSM connections (dialing, hangup, answering, SMS, etc.); management and control of Bluetooth connections (ringing, hangup, etc.); management of OTA firmware images in flash; passthrough of data between GSM and Bluetooth SPP connections; switch monitoring and LED control); flash management of SMS, MMS, and NFC data.

Referring now to FIG. 9, a system architecture in accordance with embodiments of the present technology is shown. FIG. 9 shows dataflow manager 901 coupled with a NFC chip, a GSM/GPRS, and Bluetooth 912, as well as flash 808. In one embodiment, dataflow manager 901 includes dataflow firmware 904 and bootloader 902. In another embodiment, dataflow manager 901 further includes USART1 928 corresponding to NFC (UART) 828 of the NFC chip 908, USART2 918 corresponding to the GSM (UART) 818 of the GSM/GPRS 910, and USART3 952 corresponding to the Bluetooth (UART) 852 of the Bluetooth 912. Further, dataflow manager 901 is also coupled with flash 808.

In one embodiment, the NFC chip 908 can communicate with UAE 934 and MCRM 936 and includes an NFC radio 914, and NFC protocol 916, as well as the NVD (UART) 828. In one embodiment, the GSM/GPRS 910 includes the GSM radio 918, the GSM application 920, an I2S 922, as well as the GSM (UART) 818. In one embodiment, the Bluetooth 912 includes a Bluetooth radio 924, a Bluetooth application 926, an I2S 928, as well as the Bluetooth (UART) 852.

In one embodiment, UAE 930 may be a Bluetooth device that is capable of communications with the Bluetooth radio 924 over a communication and a data port. For example, the UAE 930 may be a headset. In one embodiment, a second UAE 932 may also be a Bluetooth device and communicates with the Bluetooth radio 924 over a command port.

Further, FIG. 9 shows flash 808 as comprising user memory 905 and firmware 906, in one embodiment. Firmware 906 includes, but is not limited to the following: MCU firmware; Bluetooth firmware; GSM firmware; and near field communications parameters.

Various embodiments of the present technology are thus described. While the present technology has been described in particular embodiments, it should be appreciated that the present technology should not be construed as limited by such embodiments, but rather construed according to the following claims.

Operations for Tagging an Element

Figure 12:
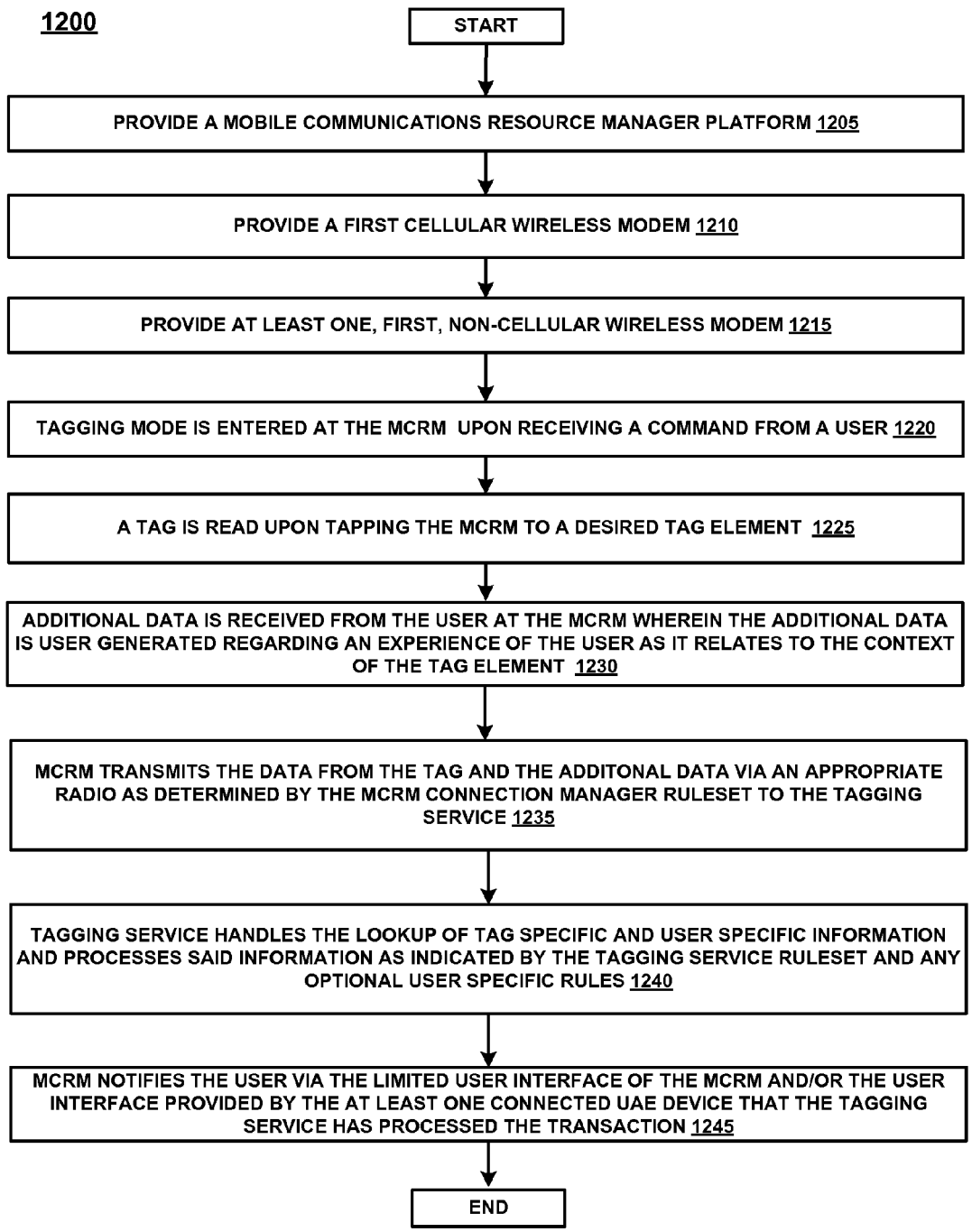
FIG. 12 is a flowchart of a method for tagging an element, in accordance with embodiments of the present technology.
Figure 13:
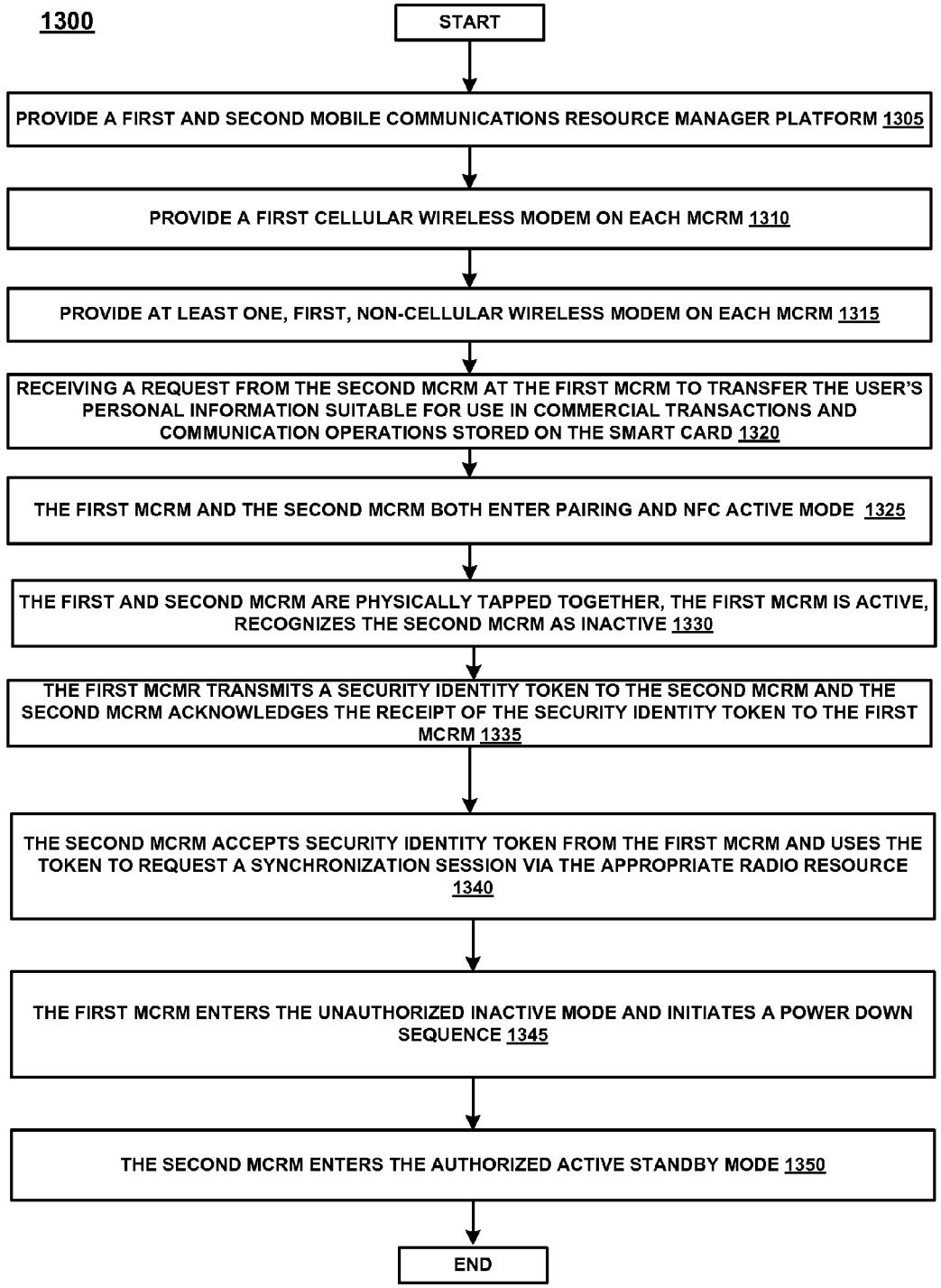
FIG. 13 is a flowchart of a method for pairing a first mobile communications resource manager platform to a second mobile communications resource manager platform, in accordance with embodiments of the present technology.

Referring now to 1200 of FIG. 12, a process for tagging an element. It should be appreciated that 1200 is not limited to a particular order unless otherwise noted. At 1205, provide a mobile communications resource manager platform. At 1210, provide a first cellular wireless modem. At 1215, provide at least one, first, non-cellular wireless modem. At 1220, a tagging mode is entered at the MCRM upon receiving a command from a user. In one embodiment, the user commands entry to tagging mode by pressing an appropriate button on either the MCRM or a UAE device.

At 1225, a tag is read upon tapping the MCRM to a desired tag element. Such a tapping could be a physical tap or could be placing the MCRM in close proximity to the tag element. At 1230, additional data is received from the user at the MCRM wherein the additional data is user generated regarding an experience of the user as it relates to the context of the tag element. At 1235, MCRM transmits the data from the tag and the additional data via an appropriate radio as determined by the MCRM connection manager ruleset to the tagging service. At 1240, tagging service handles the lookup of tag specific and user specific information and processes said information as indicated by the tagging service ruleset and any optional user specific rules. At 1245, MCRM notifies the user via the limited user interface of the MCRM and/or the user interface provided by the at least one connected uae device that the tagging service has processed the transaction.

Operations for Pairing a First Mobile Communications Resource Manager Platform to a Second Mobile Communications Resource Manager Platform Referring now to 1200 of FIG. 12, a process for tagging an element. It should be appreciated that 1200 is not limited to a particular order unless otherwise noted. At 1305, provide a first and second mobile communications resource manager platform. At 1310, provide a first cellular wireless modem on each MCRM. At 1315, provide at least one, first, non-cellular wireless modem on each MCRM. At 1320, receiving a request from the second MCRM at the first MCRM to transfer the user's personal information suitable for use in commercial transactions and communication operations stored on the smart card. At 1325, the First MCRM and the second MCRM both enter pairing and NFC active mode. At 1330, the first and second MCRM are physically tapped together, the first MCRM is active, recognizes the second MCRM as inactive. At 1335, the first MCRM transmits a security identity token to the second MCRM and the second MCRM acknowledges the receipt of the security identity token to the first MCRM. At 1340, the second MCRM accepts security identity token from the first MCRM and uses the token to request a synchronization session via the appropriate radio resource. At 1345, the first MCRM enters the unauthorized inactive mode and initiates a power down sequence. At 1350, the second MCRM enters the authorized active standby mode.

Appendix A

The following is a glossary of terms used throughout the disclosure:
API: Application Programming Interface
Bluetooth: Short Range Wireless Communications System
BOM: Bill of Materials
cdma2000: Code-division multiple access standard circa 2000
Cloud: Remoted networked computing system
eComerce: Electronic Commerce
EDGE: Enhanced Data Rate for GSM Evolution; part of 2nd Generation cellular networks "2G"
EVDO: Evolution-Data Optimized component of 3G system
GPRS: General Packet Radio Service
GPS: Global Positioning System
GSM: Group Special Mobile, now Global System for Mobile Communications
HSPA: High-Speed Packet Access for 3rd Generation (3G) networks
iRDA: Infrared Data Association
LAN Local Area Network
LED: Light Emitting Diode
LTE: Long-Term Evolution also known as 4th Generation (4G)
MCRM: Mobile Communications Resource Management System
MMS: Multi-Media Messaging Service
MNO: Mobile Network Operator
MP3: Mpeg audio layer 3 data encoding/decoding standard for audio digital systems
MPEG: Moving Picture Experts Group
NFC: Near-Field Communications very short range wireless
OS: Operating System (for a processor/computer)
OTA: Over the Air
PAN: Personal Area Network
PC: Personal Computer
PLMN: Public Land Mobile Network
POS: Point of Sale
QoS: Quality of Service
RF: Radio Frequency
RIL: Radio Interface Layer
SC-TDMA: Single-Carrier Time Division Multiple Access
SDR: Software-Defined Radio
SIM: Subscriber Identity Module
SKU: Stock-Keeping Unit
SMS: Short Message Service
UAE: User Accessible Electronic Device
UI: User Interface
Universal Mobile Telecommunications System for 3G UMTS: networks
USB: Universal Serial Bus
Wi-Fi: Trademark of the Wi-Fi Alliance; designates a wireless local area network
WiMax: Worldwide Interoperatbility for Microwave Access Access is a telecommunications protocol that provides fixed and fully mobile Internet access.
WLAN: Wireless Local Area Network

What is claimed is:

1. A mobile communications resource manager (MCRM), comprising:
at least one smart card configured to accept and store a user's personal information suitable for use in commercial transactions and communications operations;
at least one cellular radio modem; at least one non-cellular radio modem; a controller configured for:
establishing a short-range wireless connection via said non-cellular modem to at least one user accessible electronic device with human interface functionality; accepting a service request from said at least one user accessible electronic device; and making a modem selection by selecting either a cellular or a non-cellular connection via a modem resident in said mobile communications resource manager to provide t-he a communications link for said service request, based on a rule resident in said mobile communications resource manager, and
a near field communication modem for use in management of connections and proximity based connectionless transactions of said at least one of a plurality of user accessible electronic devices, wherein said near field communication modem comprises:
an identity transfer module configured for enabling a transfer of identity and related personal and system data between at least two mobile communications resource managers that are of a same type, wherein one of said at least two mobile communications resource managers is a transfer initiating device, said transfer enabling said transfer initiating device with shared identical credentials and disabling a second device of said at least two mobile communications resource managers, wherein said second device that is disabled loses an ability to access said credentials stored within it, said credentials needed for transaction or identity authentication.

2. The mobile communications resource manager of claim 1, wherein said mobile communications resource manager has no high resolution graphical user interface display and no alphanumeric keypad.

3. The mobile communications resource manager of claim 1, wherein said rule further comprises at least one of the following:
making said modem selection based on needs of said service request;

making said modem selection based on a user-selected Quality of Service (QoS) metric; making said modem selection based on a conservation of spectrum metric;

making said modem selection based on a user preference, and making said modem selection based on a pre-programmed methodology to automate a procedure, without user interaction.

4. The mobile communications resource manager of claim 3, wherein said conservation of spectrum metric further comprises:

selecting a non-cellular modem whenever possible, according to Internet availability of a connection to said service request and Internet availability via said non-cellular modem connection.

5. The mobile communications resource manager of claim 3, wherein said conservation of spectrum metric further comprises:

selecting non-cellular modems for a specific communications service according to a sharing agreement between said specific communications service and a user's selected cellular service.

6. The mobile communications resource manager of claim 1, wherein said at least one user accessible electronic device is selected from a group comprising:

an unlocked cellphone; a netbook; a laptop computer; a desktop computer; a device; an MP3 player; a one-way audio headset; a two-way audio headset; an automobile locking system; an automobile alarm system; an automobile ignition system; an automobile display system; applications processors; and memory.

7. The mobile communications resource manager of claim 1, wherein said rule further comprises:

monitoring a QoS metric available from said selected modem and performing a switching function to automatically reconnect communications service to a selected server from a first selected modem to a second selected modem when the QoS metric passes a specified metric threshold.

8. The mobile communications resource manager of claim 1, wherein said smart card is configured to synchronize cloud-services based stored data to multiple user accessible electronic devices, wherein each of said multiple user accessible electronic devices has its own set of rules.

9. The mobile communications resource manage of claim 1, wherein said smart card is configured to synchronize cloud services-based stored data simultaneously without any physical connection from said mobile communications resource manager.

10. The mobile communications resource manage of claim 1, wherein said cellular radio modem comprises a software-defined radio configured to operate in a mode equivalent to that of a selected cellphone operator.

11. The mobile communications resource manager of claim 1, wherein said cellular radio modem comprises a software defined radio that is reconfigurable in said mobile communications resource manager to operate in a mode equivalent to that of a selected cellphone operator.

12. The mobile communications resource manager of claim 1, further comprising a buzzer for alerting that an incoming call has been received by said cellular radio modem via a command from said controller.

13. The mobile communications resource manager of claim 1, further comprising a buzzer or vibrator for alerting that a transaction has been successfully completed via a near field communication system via a command from said controller.

14. The mobile communications resource manager of claim 1, wherein said establishing said short-range wireless connection via said non-cellular modem to at least one user accessible electronic device further comprises providing a password for accessing said at least one user accessible electronic device determined from a lookup table accessible by said controller.

15. The mobile communications resource manager of claim 1, wherein said at least one user accessible electronic device is not equipped with a cellular modem.

16. The mobile communications resource manager of claim 15, wherein said personal information is further suitable for use in at least one of the following: commercial transactions; credential authentication; and communications operations.

17. The mobile communications resource manager of claim 1, further comprising:

a smart card acceptor module configured for accepting a foreign smart card into said MCRM, wherein upon acceptance, said information is temporarily restricted from use with said foreign smart card, wherein said information comprises personal information and credentials of said user.

* * * * *